(12) United States Patent
Nagayoshi et al.

(10) Patent No.: US 10,483,048 B2
(45) Date of Patent: Nov. 19, 2019

(54) CAPACITOR-TYPE POWER SUPPLY UNIT

(71) Applicant: HONDA MOTOR CO., LTD., Tokyo (JP)

(72) Inventors: Shogo Nagayoshi, Tochigi (JP); Shinya Watanabe, Tochigi (JP); Yasuhisa Saito, Tochigi (JP); Hitoshi Saito, Tochigi (JP); Shinyu Hirayama, Tochigi (JP); Hironori Sawamura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/977,728

(22) Filed: May 11, 2018

(65) Prior Publication Data

US 2018/0330895 A1 Nov. 15, 2018

(30) Foreign Application Priority Data

May 15, 2017 (JP) ................................. 2017-096613
May 9, 2018 (JP) ................................. 2018-090813

(51) Int. Cl.
*H01G 11/50* (2013.01)
*H01G 9/042* (2006.01)
(Continued)

(52) U.S. Cl.
CPC .............. *H01G 11/50* (2013.01); *H01G 9/042* (2013.01); *H01G 11/10* (2013.01); *H01G 11/72* (2013.01);
(Continued)

(58) Field of Classification Search
CPC ........ H01G 11/50; H01G 11/10; H01G 11/72; H01G 11/76; H01G 11/82; H01G 11/06; H01G 11/12; H01G 11/86; H01G 9/042; H01G 4/228; H01G 4/38; H01G 4/224; H01G 4/248; H01G 4/30; H01G 4/012; H01G 4/1227; H01G 4/1245
(Continued)

(56) References Cited

U.S. PATENT DOCUMENTS 7,331,799 B1 * 2/2008 Lee .......................... H01G 2/06
361/306.3

FOREIGN PATENT DOCUMENTS

JP 2001-352767 12/2001
JP 2007-311634 11/2007

* cited by examiner

*Primary Examiner* — Michael P McFadden
(74) *Attorney, Agent, or Firm* — Rankin, Hill & Clark LLP

(57) ABSTRACT

A capacitor-type power supply unit including:
a positive bus to which a plurality of capacitor is connected in parallel at each positive-electrode terminal thereof with maintaining equal intervals therebetween, and extends in a parallel direction; and an negative bus to which the plurality of capacitor is connected in parallel, at each negative-electrode terminal thereof with maintaining equal intervals therebetween, and extends in the parallel direction, in which the positive bus has a positive-electrode-side external connection part that is set at a position (SD) separated from the positive-electrode first end by a range of 20% to 30% of the total length in the longitudinal direction thereof, and the negative bus has an negative-electrode-side external connection part that is set at a position (SD) separated from the negative-electrode second end by a range of 20% to 30% of the total length in the longitudinal direction thereof.

10 Claims, 18 Drawing Sheets

(51) Int. Cl.
*H01G 11/72* (2013.01)
*H01G 11/10* (2013.01)
*H01G 11/76* (2013.01)
*H01G 11/82* (2013.01)
*H01G 11/06* (2013.01)
*H01G 11/86* (2013.01)
*H01G 4/38* (2006.01)
*H01G 11/12* (2013.01)
*H01G 4/228* (2006.01)

(52) U.S. Cl.
CPC ............. *H01G 11/76* (2013.01); *H01G 11/82* (2013.01); *H01G 4/228* (2013.01); *H01G 4/38* (2013.01); *H01G 11/06* (2013.01); *H01G 11/12* (2013.01); *H01G 11/86* (2013.01)

(58) Field of Classification Search
USPC ......................................................... 361/500
See application file for complete search history.

CAPACITOR-TYPE POWER SUPPLY UNIT

This application is based on and claims the benefit of priority from Japanese Patent Application Nos. 2017-096613 and 2018-090813, respectively filed on 15 May 2017 and 9 May 2018, the contents of which are incorporated herein by reference.

BACKGROUND OF THE INVENTION

Field of the Invention

The present invention relates to a capacitor-type power supply unit capable of supplying accumulated electrical energy to outside.

Related Art

Conventionally, various types of capacitor-type power supply units have been proposed that supply to outside electrical energy that was stored in electrical storage devices which are connected in parallel. With such capacitor-type power supply units, it may be devised such that the electric current which has been equally divided as best possible is flowed to several electrical storage devices connected in parallel. This is in order to avoid the charge and discharge electric current from concentrating on a specific electrical storage device, and the service life thereof shortening.

In order to achieve equal dividing of the electric current flowing to several electrical storage devices (capacitors) connected in parallel, technology has been proposed which provides a slit in a pattern conductor joining the capacitors in parallel (for example, refer to Patent Document 1). With the technology of Patent Document 1, the impedance of conductor parts joining each capacitor is made equal by dividing segments of the pattern conductor by way of the slits. In other words, the equal dividing of electric current flowing to the respective capacitors is achieved by making the impedance of the current paths to the respective capacitors equal.

On the other hand, with the technology of Patent Document 1, what has the equal dividing of electric current achieved by these slits is only direction in which the positive-electrode terminal and negative-electrode terminal line up, and a solution for the problem of the above-mentioned equal dividing not being sufficiently achieved in the direction orthogonal to the direction in which the positive-electrode terminal and negative-electrode terminal line up has also been proposed (for example, refer to Patent Document 2).

The technology of Patent Document 2 aligns, in first and second directions which intersect each other, a plurality of cylindrical capacitor elements having electrodes at both ends, and provides a first bus bar that mutually connects one electrode of each capacitor element, and a second bus bar that mutually connects the other electrode of each capacitor element. In the first and second bus bars, notches (slits) are formed such that divide in two each bus bar from a central position in each end of these until the vicinity of the center on the other end of these, respectively. As a result thereof, each bus bar comes to have a U-shaped planar form, and it is said as able to reduce the variation in the bus bar inductance and path resistance relative to the plurality of capacitor elements lining up in the above-mentioned first and second directions, and the variation in the heat quantity from the bus bars.

Patent Document 1: Japanese Unexamined Patent Application, Publication No. 2001-352767
Patent Document 2: Japanese Unexamined Patent Application, Publication No. 2007-311634

SUMMARY OF THE INVENTION

However, in the technology of the either of the above-mentioned patent documents, each corresponding end of the parallel connection conductor such as a pattern conductor or bus bar joining the plurality of electrical storage devices (capacitors) in parallel is made as the respective external connection parts on the positive-electrode-side and negative-electrode-side for performing connection with an external circuit. For this reason, when large electric current flows to an external connection part, a voltage drop of an extent that cannot be ignored occurs due to the resistance inherent to the parallel connection conductors themselves. In other words, since a difference arises in the voltages between the ends of the electrical storage device caused by the distance from the external connection part of each electrical storage device connected in parallel differing, equal dividing of the electric current flowing to the electrical storage devices has not been achieved. For this reason, it leads producing problems in that differences arise in the lifespan of every electrical storage device, and the service life as a capacitor-type power supply unit is shortened as a result.

The present invention has been made in order to solve the aforementioned such conventional problems, and has an object of providing a capacitor-type power supply unit for which equal dividing of electric current flowing to electrical storage devices connected in parallel of the capacitor-type power supply unit is achieved, thereby enabling to extend the service life as a capacitor-type power supply unit.

By repeating a variety of studies and simulations, the present inventors have found a solution to the above-mentioned problem, thereby arriving at completing the present invention.

A first aspect of the present invention is a capacitor-type power supply unit in which a plurality of a first to $n^{th}$ electrical storage devices (for example, the lithium ion capacitors 10 described later) are connected in parallel, where n is an integer of 6 or greater, the capacitor-type power supply unit including: a positive-electrode-side parallel connection conductor (for example, the positive-electrode-side bus bar 30 described later) in which each positive-electrode terminal (for example, the positive-electrode terminal 101 described later) of the first to $n^{th}$ electrical storage devices is connected in sequence from one end (for example, the one end 31 described later) to another end (for example, the positive-electrode second end 32 described later) of the capacitor-type power supply unit; and an negative-electrode-side parallel connection conductor (for example, the negative-electrode-side bus bar 40 described later) in which each negative-electrode terminal (for example, the negative-electrode terminal 102 described later) of the first to $n^{th}$ electrical storage devices is connected in sequence from one end (for example, the one end 41 described later) to another end (for example, the negative-electrode second end 42 described later) of the negative-electrode-side parallel connection conductor, in which the positive-electrode-side parallel connection conductor has a positive-electrode-side external connection part that is set at a position separated from an end on a side of the first electrical storage device by a length corresponding to a resistance value in a range of 20% to 30% of a resistance value from the one end to the other end, and in which the negative-electrode-side parallel connection conductor has an negative-electrode-side external connection part that is set at a position separated from an end on a side of the $n^{th}$ electrical storage device by a length corresponding to a resistance value in a range of 20% to 30% of a resistance value from the one end to the other end.

In the capacitor-type power supply unit of the first aspect, the plurality of first to $n^{th}$ electrical storage devices (n is an integer of 6 or greater) are connected in parallel by the positive-electrode-side parallel connection conductor and negative-electrode-side parallel connection conductor. Each positive-electrode terminal of the first to $n^{th}$ electrical storage devices is connected in sequence from one end to another end of positive-electrode-side parallel connection conductor. Each negative-electrode terminal of the first to $n^{th}$ electrical storage devices is connected in sequence from one end to another end of the negative-electrode-side parallel connection conductor. The positive-electrode-side parallel connection conductor has a positive-electrode-side external connection part that is set at a position separated from an end on a side of the first electrical storage device by a length corresponding to a resistance value in a range of 20% to 30% of a resistance value from the one end to the other end. The negative-electrode-side parallel connection conductor has a negative-electrode-side external connection part that is set at a position separated from an end on a side of the $n^{th}$ electrical storage device by a length corresponding to a resistance value in a range of 20% to 30% of a resistance value from the one end to the other end. By the positive-electrode-side external connection part 33 and negative-electrode-side external connection part 43 of the positive-electrode-side parallel connection conductor and the negative-electrode-side parallel connection conductor being provided at the aforementioned such position, upon a great electric current flowing through the positive-electrode-side external connection part and negative-electrode-side external connection part, the equal dividing of electric current flowing to each electrical storage device connected in parallel is achieved.

A second aspect of the present invention is a capacitor-type power supply unit in which a plurality of a first to $n^{th}$ electrical storage devices (for example, the lithium ion capacitors 10 described later) are connected in parallel, where n is an integer of 6 or greater, the capacitor-type power supply unit including: a positive-electrode-side parallel connection conductor (for example, the positive-electrode-side bus bar 30 described later) that extends in a parallel direction of the plurality of electrical storage devices, and in which each positive-electrode terminal (for example, the positive-electrode terminal 101 described later) of the first to $n^{th}$ electrical storage devices are connected in sequence from one end (for example, the one end 31 described later) to another end (for example, the positive-electrode second end 32 described later) thereof; and an negative-electrode-side parallel connection conductor (for example, the negative-electrode-side bus bar 40 described later) that extends in the parallel direction, and in which each negative-electrode terminal (for example, the negative-electrode terminal 102 described later) of the first to $n^{th}$ electrical storage devices is connected in sequence from one end (for example, the one end 41 described later) to another end (for example, the negative-electrode second end 42 described later) thereof, in which the positive-electrode-side parallel connection conductor has a positive-electrode-side external connection part that is set at a position separated from an end on a side of the first electrical storage device by a range of 20% to 30% of a total length in a longitudinal direction thereof, and in which the negative-electrode-side parallel connection conductor has an negative-electrode-side external connection part that is set at a position separated from an end on a side of the $n^{th}$ electrical storage device by a range of 20% to 30% of a total length in a longitudinal direction thereof.

In the capacitor-type power supply unit of the second aspect, the plurality of first to $n^{th}$ electrical storage devices (n is an integer of 6 or greater) are connected in parallel by the positive-electrode-side parallel connection conductor and negative-electrode-side parallel connection conductor. The positive-electrode-side parallel connection conductor extends in a parallel direction of the plurality of the electrical storage devices, and each positive-electrode terminal of the first to $n^{th}$ electrical storage device is connected in sequence from one end to another end of the positive-electrode-side parallel connection conductor. The negative-electrode-side parallel connection conductor extends in a parallel direction of the plurality of the electrical storage devices, and each negative-electrode terminal of the first to $n^{th}$ electrical storage device is connected in sequence from one end to another end of the negative-electrode-side parallel connection conductor. The positive-electrode-side parallel connection conductor has a positive-electrode-side external connection part that is set at a position separated from an end on a side of the first electrical storage device by a range of 20% to 30% of a total length in a longitudinal direction thereof. The negative-electrode-side parallel connection conductor has a negative-electrode-side external connection part that is set at a position separated from an end on a side of the $n^{th}$ electrical storage device by a range of 20% to 30% of a total length in a longitudinal direction thereof. By the positive-electrode-side external connection part 33 and negative-electrode-side external connection part 43 of the positive-electrode-side parallel connection conductor and the negative-electrode-side parallel connection conductor being provided at the aforementioned such position, upon a great electric current flowing through the positive-electrode-side external connection part and negative-electrode-side external connection part, the equal dividing of electric current flowing to each electrical storage device connected in parallel is achieved.

According to a third aspect of the present invention, in the capacitor-type power supply unit as described in the first or second aspect, the positive-electrode-side parallel connection conductor has a positive-electrode connection conductor part (for example, the positive-electrode connection conductor part 30a described later) to which respective positive-electrode terminals of the plurality of electrical storage devices are connected, and a positive-electrode-side external connection conductor part (for example, the positive-electrode-side external connection conductor part 30b described later) that is provided in parallel at predetermined intervals with the positive-electrode connection conductor part, and is connected with the positive-electrode connection conductor part at a site corresponding to the positive-electrode-side external connection part on the positive-electrode connection conductor part, and the negative-electrode-side parallel connection conductor has an negative-electrode connection conductor part (for example, the negative-electrode connection conductor part 40a described later) to which respective negative-electrode terminals of the plurality of electrical storage devices are connected, and an negative-electrode-side external connection conductor part (for example, the negative-electrode-side external connection conductor part 40b described later) that is provided in parallel at predetermined intervals with the negative-electrode connection conductor part, and is connected with the negative-electrode connection conductor part at a site corresponding to the negative-electrode-side external connection part on the negative-electrode connection conductor part.

In the capacitor-type power supply unit as described in the third aspect, equal dividing of electric current flowing to the individual electrical storage devices which are connected in parallel is achieved particularly by the positive-electrode connection conductor part and the negative-electrode connection conductor part in the capacitor-type power supply unit as described in the first or second aspect. Furthermore, even if connecting with a load or another external circuit at any location of the positive-electrode-side external connection conductor part and negative-electrode-side external connection conductor part provided in parallel at predetermined intervals with the positive-electrode connection conductor part and negative-electrode connection conductor part, respectively, the equal dividing of electrical current flowing to the individual electrical storage devices will not be hindered, and the externally connecting position will be not restricted.

According to a fourth aspect of the present invention, in the capacitor-type power supply unit as described in any one of the first to third aspects, the electrical storage device is a lithium ion capacitor or a serial connection body thereof.

In the capacitor-type power supply unit as described in the fourth aspect, a capacitor-type power supply unit is realized that is particularly superior in high temperature durability performance and for which equalization of the service life of individual electrical storage devices is achieved in the capacitor-type power supply unit as described in any one of the first to third aspects.

According to a fifth aspect of the present invention, in the capacitor-type power supply unit as described in any one of the first to third aspects, the electrical storage device is a rechargeable battery or a serial connection body thereof.

In the capacitor-type power supply unit described in the fifth aspect, a capacitor-type power supply unit is realized particularly for which equal dividing of charge/discharge current of individual rechargeable batteries connected in parallel to constitute the electrical storage device or a serial connection body thereof is achieved, and equalization of the service life of individual electrical storage devices is achieved, for the capacitor-type power supply unit as described in any one of the first to third aspects.

According to the present invention, it is possible to realize a capacitor-type power supply unit for which equal dividing of electric current flowing to electrical storage devices connected in parallel in the capacitor-type power supply unit is achieved, thereby enabling to extend the service life as a capacitor-type power supply unit.

DETAILED DESCRIPTION OF THE INVENTION

Figure 1:
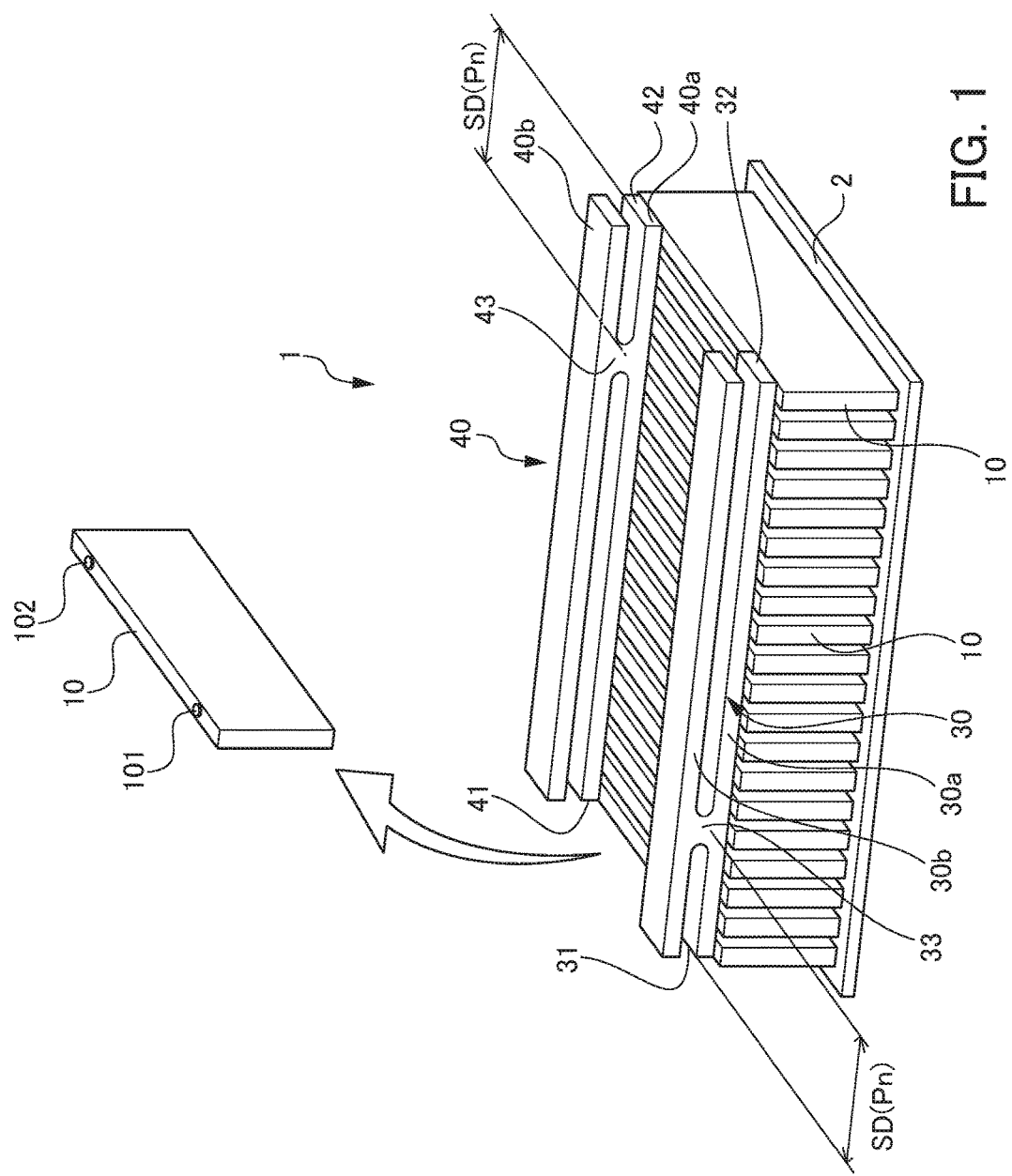
FIG. 1 is an external appearance perspective view showing an embodiment of a capacitor-type power supply unit of the present invention.
Figure 2:
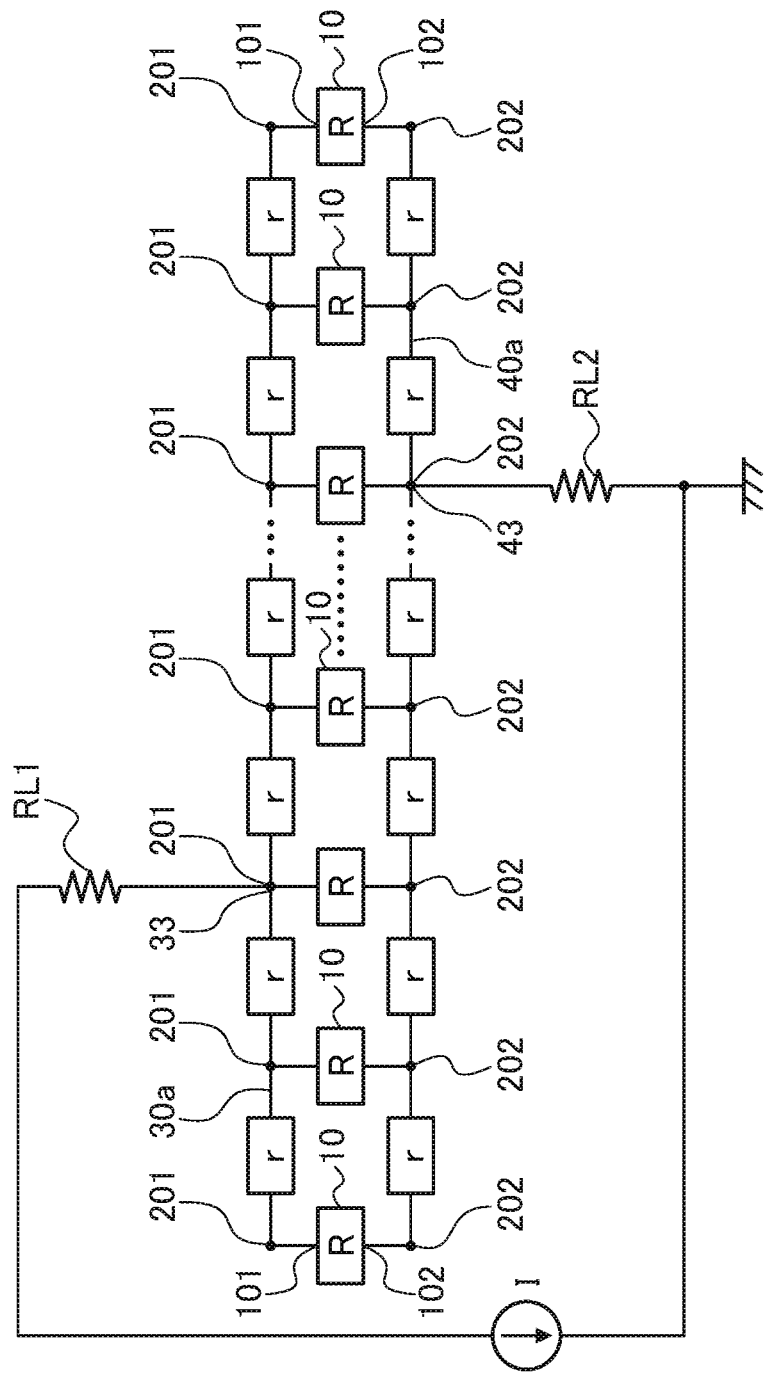
FIG. 2 is a circuit diagram showing a general configuration of the capacitor-type power supply unit of the present invention.

Hereinafter, a capacitor-type power supply unit of the present invention will be explained in detail by referencing the drawings. FIG. 1 is an external appearance perspective view showing an embodiment of the capacitor-type power supply unit of the present invention. FIG. 2 is a circuit diagram showing a general configuration of the capacitor-type power supply unit of the present invention. The electrical connection relationships of each part of the capacitor-type power supply unit in FIG. 1 are understood by referencing FIG. 2 where appropriate. In FIG. 1, a plurality of lithium ion capacitors 10, which are the respective electrical storage devices, are arranged in a row on a base 2, and the plurality of these lithium ion capacitors 10 are connected in series, whereby the capacitor-type power supply unit 1 is configured. The internal resistance of each of the lithium ion capacitors 10 is expressed as "R" in FIG. 2.

Each of the lithium ion capacitors 10 in the present example is a rectangular solid shape of the same specification. In FIG. 1, the external appearance of a stand-alone lithium ion capacitor 10 is illustrated at the top. Each of the lithium ion capacitors 10 has a positive-electrode terminal 101 and negative-electrode terminal 102 at a top part on the opposing side to a bottom part which contacts with the base 2. Each of the lithium ion capacitors 10 can adopt a form of a serial connection body (lithium ion capacitor module) in which single lithium ion capacitors are connected in series at the inside of each.

In order to connect in parallel each of the lithium ion capacitors 10, a positive-electrode-side bus bar 30 is provided as a positive-electrode-side parallel connection conductor that connects the positive-electrode terminals 101 of the respective lithium ion capacitors 10. Similarly, a negative-electrode-side bus bar 40 is provided as a negative-electrode-side parallel connection conductor that connects the negative-electrode terminals 102 of the respective lithium ion capacitors 10.

The positive-electrode-side bus bar 30 has a positive-electrode connection conductor part 30*a* to which the positive-electrode terminal 101 of each of the lithium ion capacitors 10 is connected, and a positive-electrode-side external connection conductor part 30*b* that is provided in parallel at predetermined intervals with this positive-electrode connection conductor part 30*a*. The respective positive-electrode terminals 101 of each of the lithium ion capacitors 10 are connected from a positive-electrode first end 31 thereof until a positive-electrode second end 32 to the positive-electrode connection conductor part 30*a* of the positive-electrode-side bus bar 30.

In detail, for each connection node 201 in FIG. 2 at which each positive-electrode terminal 101 is connected to the positive-electrode connection conductor part 30*a* (cannot be seen in FIG. 1 because below positive-electrode-side bus bar 30), each of the positive-electrode terminals 101 of the respective lithium ion capacitors 10 is connected to the positive-electrode-side bus bar 30 (positive-electrode connection conductor part 30*a*) at intervals for which the resistance values r between adjacent nodes are equal (refer to FIG. 2).

Similarly to the aforementioned positive-electrode-side bus bar 30, the negative-electrode-side bus bar 40 has an negative-electrode connection conductor part 40*a* to which the negative-electrode terminals 102 of each of the lithium ion capacitors 10 are connected, and an negative-electrode-side external connection conductor part 40*b* provided in parallel at predetermined intervals with this negative-electrode connection conductor part 40*a*. For the negative-electrode connection conductor part 40*a* of the negative-electrode-side bus bar 40, the respective negative-electrode terminals 102 of the respective lithium ion capacitors 10 are connected from a negative-electrode first end 41 until a negative-electrode second end 42 thereof.

In detail, for each connection node 202 in FIG. 2 at which each negative-electrode terminal 102 is connected to the negative-electrode connection conductor part 40*a* (cannot be seen in FIG. 1 because below negative-electrode-side bus bar 40), each of the negative-electrode terminals 102 of the respective lithium ion capacitors 10 is connected to the negative-electrode-side bus bar 40 (negative-electrode connection conductor part 40*a*) at intervals at which the resistance values r between adjacent nodes are equal (refer to FIG. 2).

At the positive-electrode connection conductor part 30*a* of the positive-electrode-side bus bar 30, the positive-electrode-side external connection part 33 is provided at a position separated from the positive-electrode first end 31 by an amount such that the resistance value is in the range of 20% to 30% of the resistance value from the positive-electrode first end 31 to the positive-electrode second end 32. In FIG. 1, the separation distance from the positive-electrode first end 31 to positive-electrode-side external connection part 33 is expressed as SD.

On the other hand, at the negative-electrode connection conductor part 40*a* of the negative-electrode-side bus bar 40, the negative-electrode-side external connection part 43 is provided at a position separated from the negative-electrode second end 42 by an amount such that the resistance value in the range of 20% to 30% of the resistance value from the negative-electrode second end 42 to the negative-electrode first end 41. In FIG. 1, the separation distance from the negative-electrode second end 42 until the negative-electrode-side external connection part 43 is expressed as SD.

In the present embodiment, the positive-electrode connection conductor part 30*a* and negative-electrode connection conductor part 40*a* are configured by an electrically conductive material for which the resistivity is uniform, and the cross section is even. Therefore, since the resistance values r between respective connection nodes 201 in FIG. 2 at which each of the positive-electrode terminals 101 of the respective lithium ion capacitors 10 is connected to the positive-electrode connection conductor part 30*a* are equal, the physical intervals between the respective connection nodes 201 are equal.

Similarly, since the resistance values r between respective connection nodes 202 in FIG. 2 at which each of the negative-electrode terminals 102 of the respective lithium ion capacitors 10 is connected to the negative-electrode connection conductor part 40*a* are equal, the physical intervals between the respective connection nodes 202 are equal. Furthermore, in the present embodiment, due to being arranged in plurality on the base 2 so that the physical intervals of the respective lithium ion capacitors 10 become equal, it is possible to see the aforementioned separation distance SD as being the interval distance in proportion to Pn equivalents, which is the number of lithium ion capacitors 10.

It should be noted that, as in FIG. 2, the external resistance between the positive-electrode-side external connection part 33 and ground is expressed as RL1, and the external resistance between the negative-electrode-side external connection part 43 and ground is expressed as RL2.

In the capacitor-type power supply unit 1 of the present invention, equal dividing of the electric current flowing through the respective lithium ion capacitors 10 is achieved by the positions of the positive-electrode-side external connection part 33 and negative-electrode-side external connection part 43 being set as mentioned above. The point of equal dividing of electric current being achieved will be described further by referencing the drawings.

The positive-electrode connection conductor part 30*a* is connected with the positive-electrode-side external connection conductor part 30*b* via the aforementioned positive-electrode-side external connection part 33. Furthermore, the positive-electrode-side external connection conductor part 30*b* is connected with the external circuit of another load (not illustrated).

Similarly, the negative-electrode connection conductor part 40*a* is connected with the negative-electrode-side external connection conductor part 40*b* via the negative-electrode-side external connection part 43. Furthermore, the negative-electrode-side external connection conductor part 40*b* is connected with the external circuit of another load (not illustrated).

In other words, in the present embodiment, the positive-electrode connection conductor part 30*a* and positive-electrode-side external connection conductor part 30*b* are provided in parallel, and the positive-electrode connection conductor part 30*a* and positive-electrode-side external connection conductor part 30b are connected by the positive-electrode-side external connection part 33 provided at the aforementioned position.

Similarly, the negative-electrode connection conductor part 40a and negative-electrode-side external connection conductor part 40b are provided in parallel, and the negative-electrode connection conductor part 40a and negative-electrode-side connection conductor part 40b are connected by the negative-electrode-side external connection part 43 provided at the aforementioned position.

Therefore, in the case of being connected by a bonding wire, etc. (not illustrated) to the external circuit of another load from the positive-electrode-side external connection conductor part 30b and negative-electrode-side external connection conductor part 40b, and in the case of performing transfer of electric current at any location of the positive-electrode-side external connection conductor part 30b and negative-electrode-side external connection conductor part 40b, the position of the aforementioned connection point of the positive-electrode connection conductor part 30a and negative-electrode connection conductor part 40a relative to the connection with the respective lithium ion capacitors 10 will remain unchanged. Therefore, the equal dividing of electric current flowing to the respective lithium ion capacitors 10 is not inhibited, and the externally connecting position is not restricted.

Figure 3:
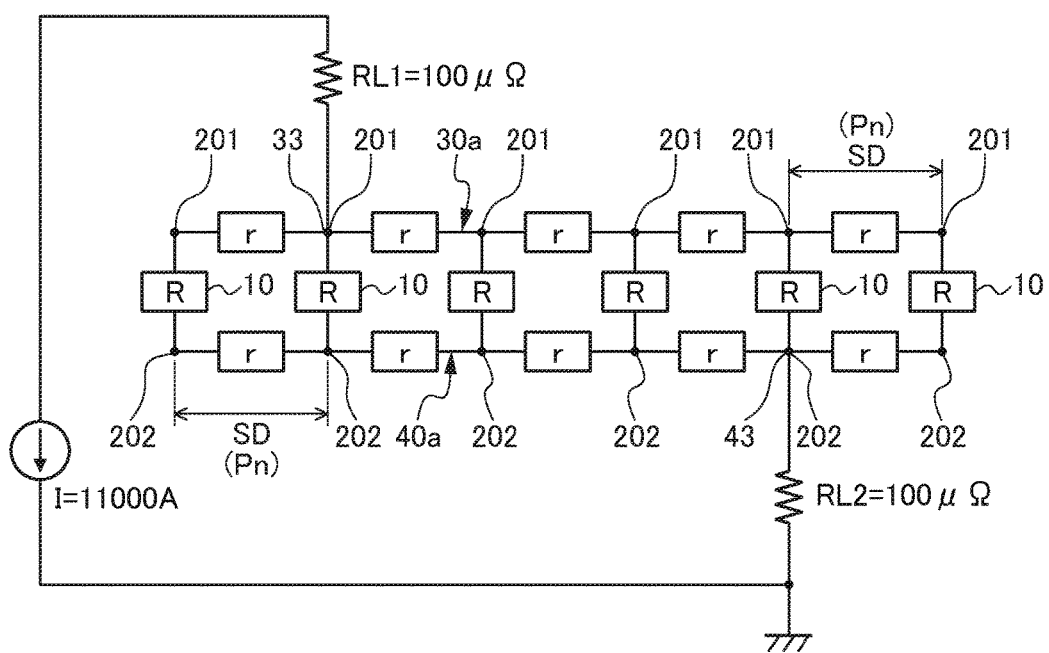
FIG. 3 is a circuit diagram applied for performing simulation related to the electric current extraction position for the capacitor-type power supply unit of the present invention.

FIG. 3 is a circuit diagram applied for simulating the characteristics in a case of establishing the parallel number of electrical storage devices as an independent variable, and establishing the electric current extraction position as a dependent variable, for the capacitor-type power supply unit of the present invention. In the circuit diagram of FIG. 3, it is configured so as to supply the electrical energy stored in the parallel connection body of n-number of lithium ion capacitors 10 (FIG. 3 exemplarily notes a case of 6) to the external circuit (resistances RL1, RL2) by extracting from the positive-electrode-side external connection part 33 and negative-electrode-side external connection part 43. Upon performing simulation, when defining the resistance of an external circuit RL1=Rl2=100 μΩ, and defining the extracted current I=11000 A, the current extraction position when the differential value ΔIA between the maximum value and minimum value for electric current flowing to the lithium ion capacitor 10 according to the parallel connection number of lithium ion capacitors 10 becomes a minimum is expressed as the separation distance SD (%) from the end of the connection conductor part as previously mentioned. In addition, as previously mentioned by referencing FIG. 2, the respective resistance values r between adjacent nodes related to the respective connection nodes 201 between the positive-electrode connection conductor part 30a and positive-electrode terminal 101 of the lithium ion capacitor 10 are equal, and the respective resistance values between adjacent nodes related to the connections nodes 202 between the negative-electrode connection conductor part 40a and negative-electrode terminal 102 of the lithium ion capacitor 10 are equal.

Figure 4:
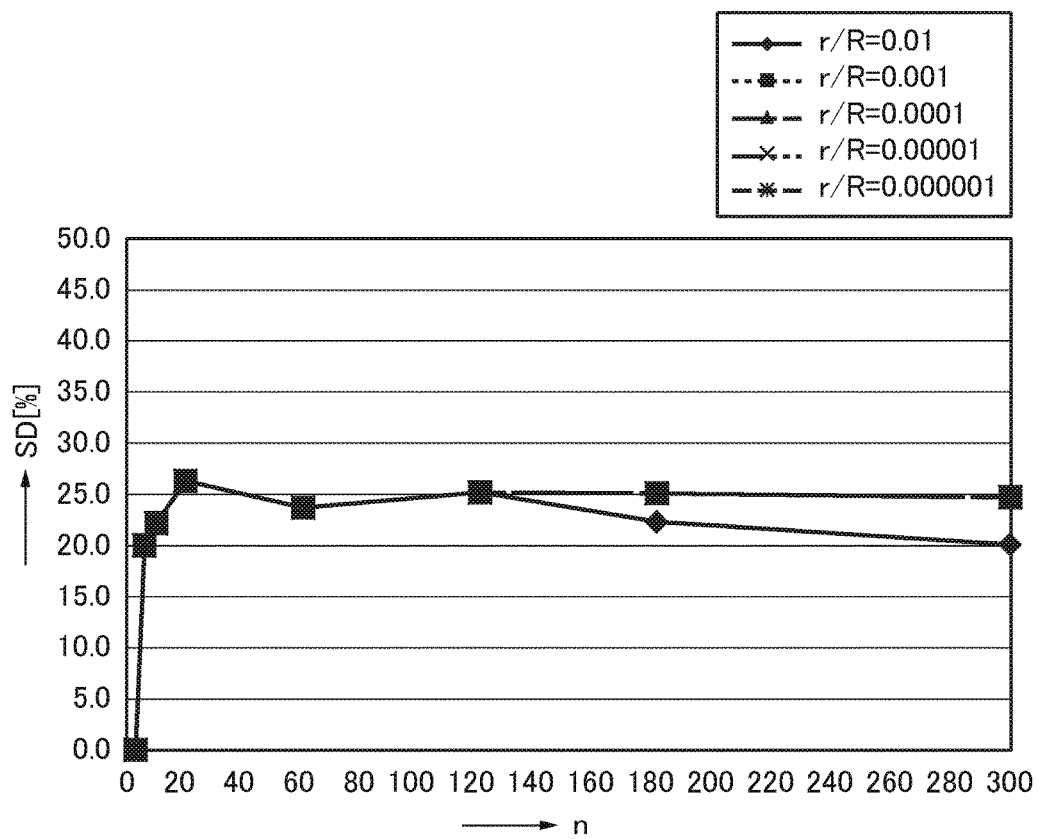
FIG. 4 is a graph representing simulation results for a case of applying a plurality of parameters for the circuit of FIG. 3.

FIG. 4 is a graph representing the simulation results for the circuit of FIG. 3. The characteristic curve in FIG. 4 represents the characteristics for a case of defining the parallel connection number n of the lithium ion capacitors 10 as an independent variable, and defining the current extraction position (aforementioned position expressed by SD) as a dependent variable. The characteristic curves in FIG. 4 represent simulation results for a case with the ratio of r/R between the aforementioned resistance value r between adjacent nodes and the internal resistance R of the lithium ion capacitor 10 as a parameter, and the five passes of r/R=0.01, r/R=0.001, r/R=0.0001, r/R=0.00001 and r/R=0.000001, for the parallel connection number n of lithium ion capacitors 10 and the extraction position of electric current (aforementioned position expressed by SD) at which the differential value ΔIA between the maximum value and minimum value for electric current flowing to the lithium ion capacitor 10 becomes a minimum. It should be noted that the simulation results for the five runs of resistance ratio r/R are illustrated in FIG. 4 by changing the line types, respectively. However, the simulation results for the cases setting the resistance ratio r/R to 0.0001, 0.00001 and 0.000001 are almost the same as the simulation results for the case of setting the resistance ratio r/R to 0.001; therefore, the simulation results of these four runs are overlapping in FIG. 4. In detail, the differential value ΔIA between the maximum value and minimum value of electric current is the difference between the electric current value Imax for which the discharge current value is a maximum, and the electric current value Imin for which the discharge current value is a minimum, among the n-number of lithium ion capacitors 10 connected in parallel. It should be noted that, as previously described, the resistance value r between adjacent nodes 201, 201 of the positive-electrode connection conductor part 30a is equal to the resistance value r between adjacent nodes 202, 202 of the negative-electrode connection conductor part 40a.

From the characteristic curve in FIG. 4, it is deciphered that, in the case of the parallel number n of lithium ion capacitors 10 being at least 6, the electric current extraction position SD (ratio of distance from end of connection conductor part until electric current extraction position, relative to total length of connection conductor part) when the differential value ΔIA between the maximum value and minimum value of the electric current flowing to the lithium ion capacitor 10 becomes a minimum is within the range of 20% to 30% mostly irrespective of the magnitude of the resistance ratio r/R.

The capacitor-type power supply unit 1 as an embodiment of the present invention explained above by referencing the drawings is a capacitor-type power supply unit in which a plurality of first to $n^{th}$ (n is an integer of 6 or greater) lithium ion capacitors which are electrical storage devices are connected in parallel. The positive-electrode-side bus bar 30 (positive-electrode connection conductor part 30a) connects the respective positive-electrode terminals 101 of the first to $n^{th}$ lithium ion capacitors 10 in the aforementioned order at intervals at which the resistance values r between connection nodes 201 with adjacent positive-electrode terminals from the connection node 201 at one end 31 until the connection node 201 at the positive-electrode second end 32 become equal, and the positive-electrode-side external connection part 33 is set at the position SD separated from one end 31 (end 31 on side of first lithium ion capacitor 10) by a length corresponding to the resistance value in the range of 20% to 30% of the resistance value from one end 31 to the positive-electrode second end 32. In addition, the negative-electrode-side bus bar 40 (negative-electrode connection conductor part 40a) connects from the respective negative-electrode terminals 102 of a plurality of the first to $n^{th}$ (n is an integer of 6 or greater) lithium ion capacitors 10 which are electrical storage devices, in the aforementioned order at intervals at which the resistance values r between connection nodes 202 with adjacent negative-electrode terminals become equal, and the negative-electrode-side external connection part 43 is set at the position SD separated from the negative-electrode second end 42 (negative-electrode second end 42 on side of the $n^{th}$ lithium ion capacitor 10) by a length corresponding to the resistance value in the range of 20% to 30% of the resistance value from one end 41 until the negative-electrode second end 42.

By the positive-electrode-side external connection part 33 and negative-electrode-side external connection part 43 of the positive-electrode-side bus bar 30 and the negative-electrode-side bus bar 40 being provided at the aforementioned such position SD, upon a great electric current flowing through the positive-electrode-side external connection part 33 and negative-electrode-side external connection part 43, the equal dividing of electric current flowing to each individual lithium ion capacitor 10 connected in parallel is achieved. For this reason, the aging degradation of the respective individual lithium ion capacitors 10 which are electrical storage devices becomes substantially even, and it becomes possible to extend the service life as a capacitor-type power supply unit.

In addition, the capacitor-type power supply unit 1 as an embodiment of the present invention is a capacitor-type power supply unit in which the plurality of first to $n^{th}$ (n is an integer of 6 or greater) lithium ion capacitors which are electrical storage devices are connected in parallel. The positive-electrode-side bus bar 30 (positive-electrode connection conductor part 30a) connects the respective positive-electrode terminals 101 of the plurality of lithium ion capacitors 10 at equal intervals from the connection node 201 at one end 31 until the connection node 201 at the positive-electrode second end 32 and extends in the parallel direction of the lithium ion capacitors 10, and the positive-electrode-side external connection part 33 is set at the position SD separated from the one end 31 (end 31 on the side of the first lithium ion capacitor 10) by a range of 20% to 30% of the total length in its own longitudinal direction. In addition, the negative-electrode-side bus bar 40 (negative-electrode connection conductor part 40a) connects the respective negative-electrode terminals 102 of the plurality of lithium ion capacitors 10 at equal intervals from the connection node 202 at one end of itself until the connection node 202 at the negative-electrode second end 42 and extends in the parallel direction, and the negative-electrode-side external connection part 43 is set at the position SD separated from the negative-electrode second end 42 (negative-electrode second end 42 on the side of the $n^{th}$ lithium ion capacitor 10) by the range of 20% to 30% of the total length in its own longitudinal direction.

By the positive-electrode-side external connection part 33 and the negative-electrode-side external connection part 43 of the positive-electrode-side bus bar 30 (positive-electrode connection conductor part 30a) and negative-electrode-side bus bar 40 (negative-electrode connection conductor part 40a) being provided at the aforementioned such position SD, upon a great electric current flowing through the positive-electrode-side external connection part 33 and negative-electrode-side external connection part 43, the equal dividing of electric current flowing to each individual lithium ion capacitor 10 connected in parallel is achieved. For this reason, the aging degradation of the respective individual lithium ion capacitors 10 which are electrical storage devices becomes substantially even, and it becomes possible to extend the service life as a capacitor-type power supply unit.

Furthermore, the positive-electrode-side bus bar 30 has the positive-electrode connection conductor part 30a to which the respective positive-electrode terminals 101 of the lithium ion capacitor 10 are connected, and the positive-electrode-side external connection conductor part 30b that is provided in parallel with the positive-electrode connection conductor part 30a at predetermined intervals, and connected with the positive-electrode connection conductor part 30a at a site corresponding to the positive-electrode-side external connection part 33 of the positive-electrode connection conductor part 30a. In addition, the negative-electrode-side bus bar 40 has the negative-electrode connection conductor part 40a to which the respective negative-electrode terminals 102 of the lithium ion capacitors 10 are connected, and the negative-electrode-side external connection conductor part 40b that is provided in parallel with the negative-electrode connection conductor part 40a at predetermined intervals, and is connected with the negative-electrode connection conductor part 40a at a site corresponding to the negative-electrode-side external connection part 43 of the negative-electrode connection conductor part 40a. For this reason, with the positive-electrode-side bus bar 30 and negative-electrode-side bus bar 40, even if connecting with a load or another external circuit at any location of the positive-electrode-side external connection conductor part 30a and negative-electrode-side external connection conductor part 40b provided in parallel at predetermined intervals with the positive-electrode connection conductor part 30a and negative-electrode connection conductor part 40a, respectively, the equal dividing of electrical current flowing to the individual lithium ion capacitors 10 will not be hindered, and the externally connecting position will be not restricted.

In addition, in the capacitor-type power supply unit 1 as an embodiment of the present invention, the plurality of electrical storage devices are lithium ion capacitors or a serial connection body thereof. For this reason, by way of being superior in high temperature durability performance and equalization of the service life of the individual electrical storage devices, the extension of the service life as a capacitor-type power supply unit is realized as a result.

Figure 5:
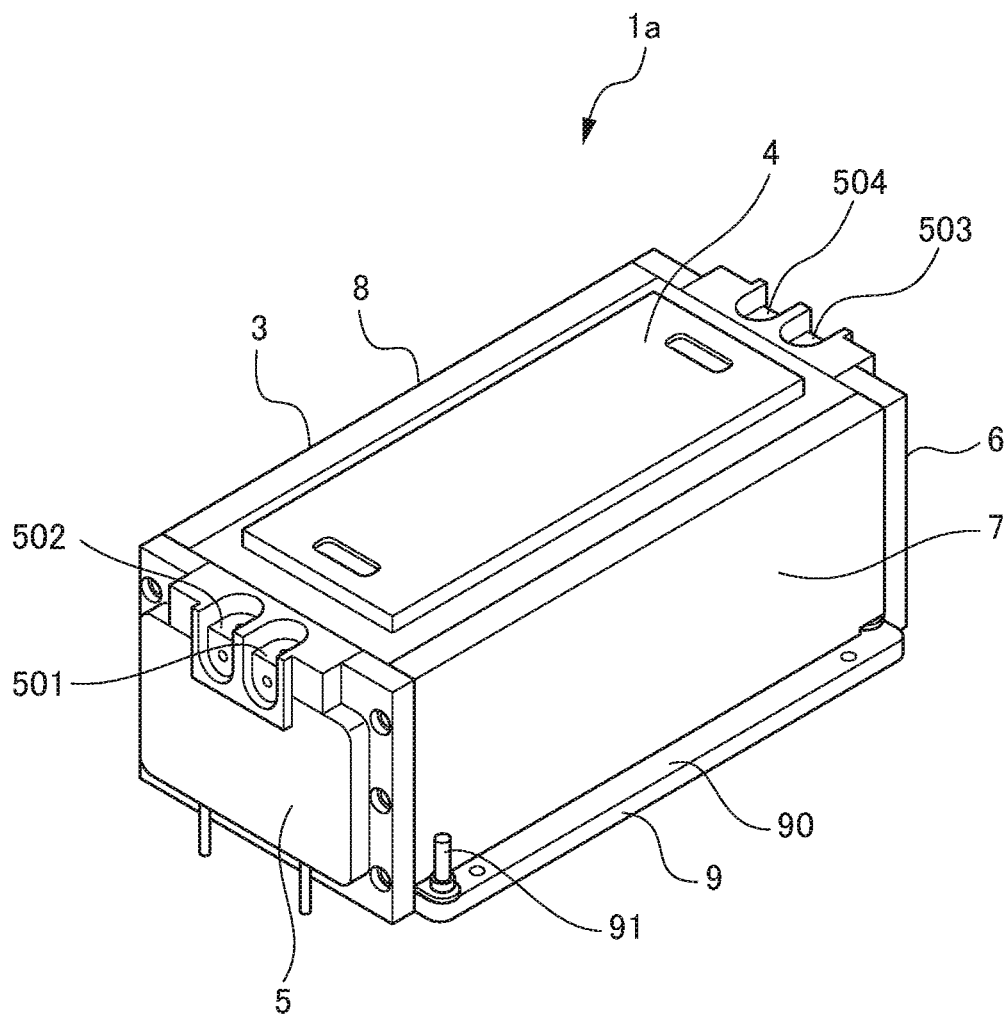
FIG. 5 is an external appearance perspective view showing another embodiment of the capacitor-type power supply unit of the present invention.
Figure 6:
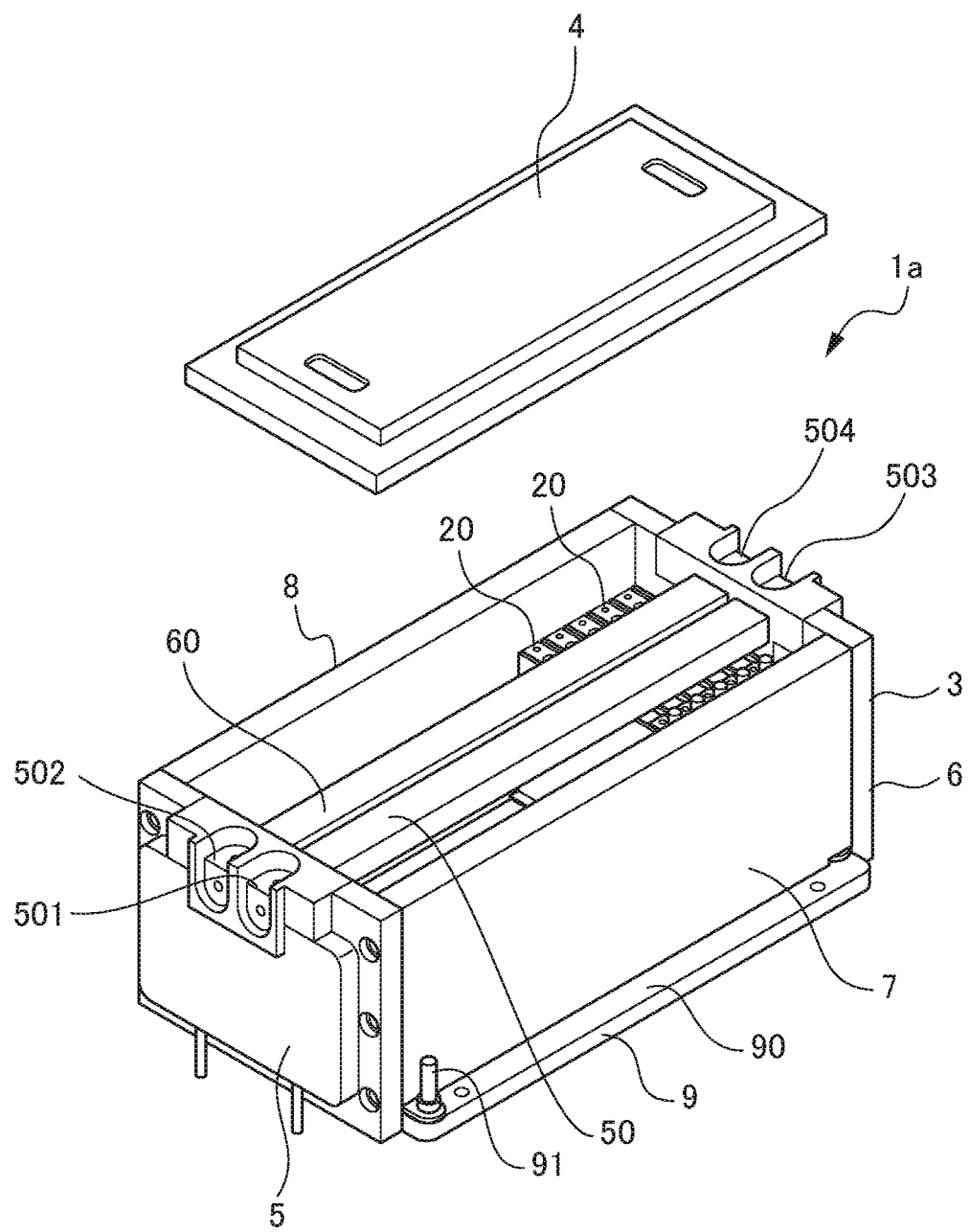
FIG. 6 is a view showing an aspect releasing a lid of the capacitor-type power supply unit in FIG. 5.

Next, a capacitor-type power supply unit as another embodiment of the present invention will be explained. FIG. 5 is an external appearance perspective view showing another embodiment of a capacitor-type power supply unit of the present invention. FIG. 6 is a view showing an aspect releasing a lid of the capacitor-type power supply unit in FIG. 5. In FIGS. 5 and 6, a capacitor-type power supply unit 1a is configured so that a substantially rectangular-shaped housing 3 in which the top is open is sealed by a lid 4. A plurality of lithium ion capacitors 20 are arranged so as to be layered along the direction of both lateral plates 7, 8 extending in the longitudinal direction in the housing 3.

In FIG. 6, a part of the total number of lithium ion capacitors 20 are illustrated. The respective lithium ion capacitors 20 are electrically connected in parallel by positive-electrode-side bus bar 50 as a positive-electrode-side parallel connection conductor and by negative-electrode-side bus bar 60 as a negative-electrode-side parallel connection conductor. The positive-electrode-side bus bar 50 and negative-electrode-side bus bar 60 are arranged so as to extend along the longitudinal direction on substantially the center in the width direction in the housing 3, and both are parallel from one first end plate 5 of the housing 3 to another second end plate 6. At the one first end plate 5 of the housing 3, a positive-electrode-side external connection terminal 501 that electrically conducts with the positive-electrode-side bus bar 50, and a negative-electrode-side external connection terminal 502 that electrically conducts with the negative-electrode-side bus bar 60 are provided at the top center of the first end plate 5.

Similarly, at the second end plate 6 of the housing 3, a positive-electrode-side external connection terminal 503 that electrically conducts with the positive-electrode-side bus bar 50, and a negative-electrode-side external connection terminal 504 that electrically conducts with the negative-electrode-side bus bar 60 are provided at the top center of the second end plate 6. It should be noted that, although the positive-electrode-side bus bar 50 and negative-electrode-side bus bar 60 are drawn schematically in FIGS. 5 and 6, the details will be explained later by referencing FIG. 8. Hereinafter, where appropriate, the positive-electrode-side external connection terminal will be abbreviated as first external connection terminal, the negative-electrode-side external connection terminal will be abbreviated as second external connection terminal, the positive-electrode-side external connection terminal 503 will be abbreviated as third external connection terminal, and the negative-electrode-side external connection terminal 504 will be abbreviated as fourth external connection terminal.

In the vantage points of FIGS. 5 and 6, a part of the water jacket 90 constituting a water cooler having an external form of thin-sheet shape is seen by configuring so that a bottom plate 9 of the housing 3 is layered on a top surface of a portion projecting outwards of the side plate 7. The water jacket 90 is inside of the housing 3, and is interposed between the top surface (inside surface) of the bottom plate 9 and the bottom of the lithium ion capacitor 20 and performs cooling of the lithium ion capacitors 20. Although external pipe connection parts 91, 92 serving as the inlet/outlet of cooling fluid are included in the water jacket 90, one external pipe connection part 91 is seen in the vantage points of FIGS. 5 and 6.

Figure 7:
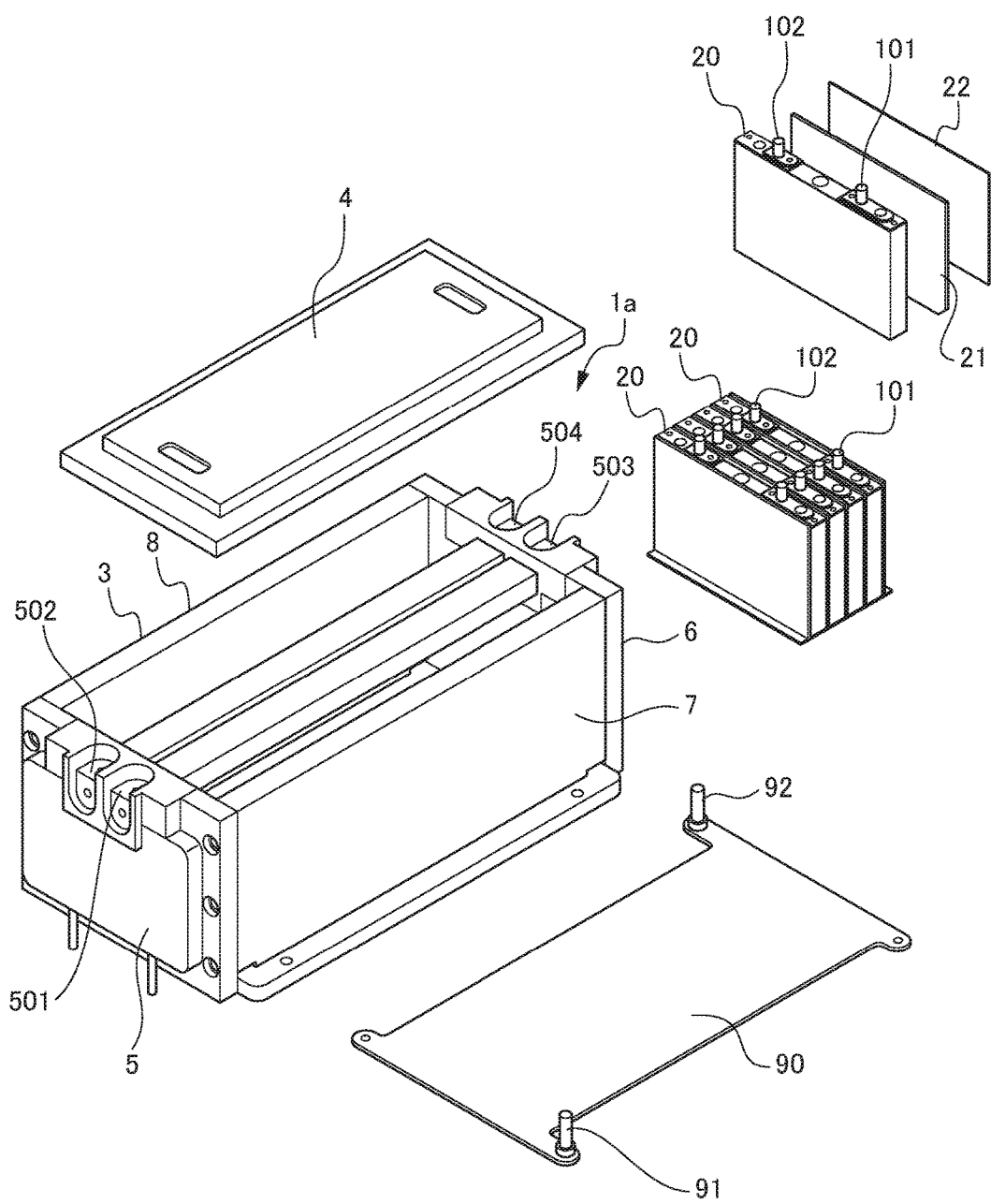
FIG. 7 is an exploded perspective view of the capacitor-type power supply unit in FIG. 5.

FIG. 7 is an exploded perspective view of the capacitor-type power supply unit in FIG. 5. In FIG. 7, the corresponding parts of previously mentioned FIGS. 5 and 6 are illustrated by attaching the same reference symbols, and individual explanations of these are omitted as appropriate. In addition, in FIG. 7, similarly to FIGS. 5 and 6, the positive-electrode-side bus bar 50 and negative-electrode-side bus bar 60 are drawn schematically. In FIG. 7, the external pipe connection parts 91, 92 of the water jacket 90 are both seen. By coolant migrating through the external pipe connection parts 91, 92 and the flow path provided inside of the water jacket 90, the water jacket 90 cools each of the lithium ion capacitors 20 arranged in contact with the top surface thereof from the bottom of these. Each of the lithium ion capacitors 20 has the positive-electrode terminal 101 and negative-electrode terminal 102, respectively. It should be noted that, also in FIG. 7, a part of all of the lithium ion capacitors 20 is illustrated.

Between the adjacent lithium ion capacitors 20, a copper plate 21 and heat transfer sheet 22 are arranged as a soaking sheet over substantially the entire area of the opposing surface parts of both. The copper plate 21 and heat transfer sheet 22 contact the water jacket 90 under these. Therefore, the heat generated by the lithium ion capacitors 20 during operation of the capacitor-type power supply unit 21a is effectively radiated towards the water jacket 90 through the copper plate 21 and heat transfer sheet 22 from the aforementioned opposing surface part.

Figure 8:
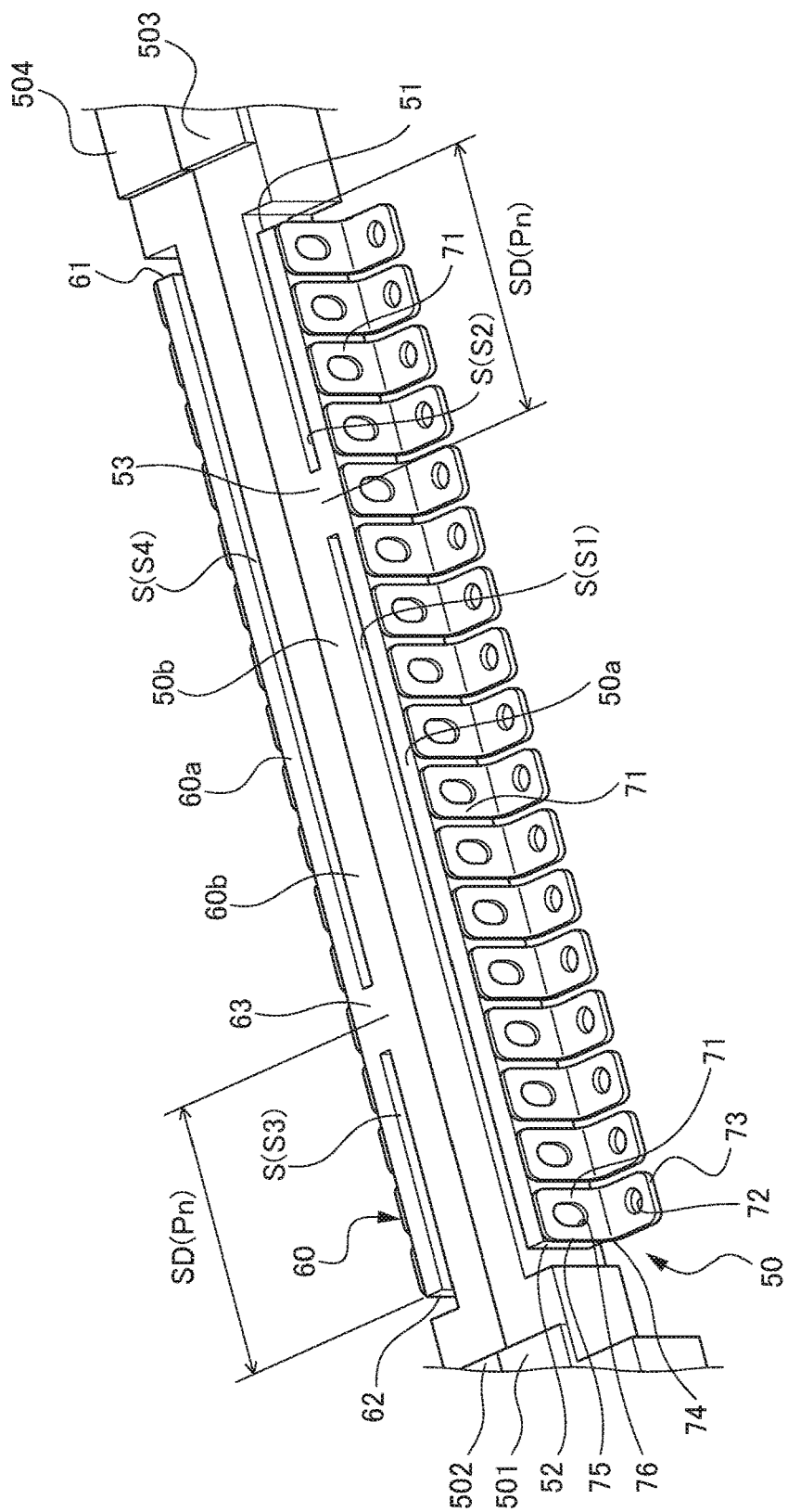
FIG. 8 is a view showing a positive-electrode-side bus bar and negative-electrode-side bus bar of the capacitor-type power supply unit in FIG. 5.

FIG. 8 is a view showing the positive-electrode-side bus bar and negative-electrode-side bus bar of the capacitor-type power supply unit in FIG. 5. As previously mentioned by referencing FIG. 6, the positive-electrode-side bus bar 50 and negative-electrode-side bus bar 60 extend along substantially the center in the width direction inside the housing 3 in the longitudinal direction, and are arranged in parallel from the first end plate 5 to second end plate 6 of the housing 3, as in the illustrations. As shown in FIG. 8, the positive-electrode-side bus bar 50 exhibits a substantially rectangular shape as a whole, and is segmented into a positive-electrode-side external connection conductor part 50b and a positive-electrode connection conductor part 50a that extends in parallel with this positive-electrode-side external connection conductor part 50b, by a slit S which is formed in the longitudinal direction of this rectangular solid and is partly interrupted. One end side of the positive-electrode-side external connection conductor part 50b is connected to the previously mentioned first external connection terminal 501, and the other end side is connected to the previously mentioned third external connection terminal 503. The positive-electrode-side external connection conductor part 50b and positive-electrode connection conductor part 50a are connected by a positive-electrode-side external connection part 53. In addition, the positive-electrode-side external connection conductor part 50b and positive-electrode connection conductor part 50a interpose the slit S and the relative positions of both are maintained by this positive-electrode-side external connection part 53.

In other words, the slit S is divided into a slit portion S1 on a side close to the first external connection terminal 501 and a slit portion S2 on a side close to the third external connection terminal 503, by the positive-electrode-side external connection part 53. By segmenting the substantially rectangular conductor extending between the first external connection terminal 501 and the third external connection terminal 503 by the aforementioned such slit portion S1 and slit portion S2, the positive-electrode-side external connection conductor part 50b and positive-electrode connection conductor part 50a which extend in parallel are formed.

As in the illustration, the slit portion S1 is formed so as to curve from the longitudinal direction of the substantially rectangular conductor to the width direction at an end nearer the first external connection terminal 501. Similarly, the slit portion S2 is formed so as to curve from the longitudinal direction of the substantially rectangular conductor towards the width direction at an end nearer the third external connection terminal 503. For this reason, the positive-electrode connection conductor part 50a exhibits as aspect of being formed by making notches which are the slit portions S1 and S2 in the substantially rectangular-shaped positive-electrode-side external connection conductor part 50b. Therefore, the positive-electrode-side external connection conductor part 50b and positive-electrode connection conductor part 50a become substantially rectangular solids as a whole while both are parallel.

Each connection piece 71 for obtaining an electrical connection with the respective positive-electrode terminals 101 (refer to FIG. 7) of the lithium ion capacitors 20 contact the positive-electrode connection conductor part 50a. The respective connection pieces 71 have a first contact plate part 73 in which a through-hole 72 penetrated the positive-electrode terminal 101 of the lithium ion capacitor 20 is provided, and a second contact plate part 75 that stands up at a right angle at a folded part 74 from one end of the first contact plate 73 and is provided so as to contact the positive-electrode connection conductor part 50a. A through-hole 76 is also formed in the second contact plate part 75.

At the positive-electrode connection conductor part 50a, each of the connection pieces 71 contacts by configuring so as to stand in a row in the longitudinal direction from the positive-electrode first end 51 which is one end (end nearer the third external connection terminal 503) until the positive-electrode second end 52, which is the other end (end nearer the first external connection terminal 501). The position of each of the connection pieces 71 on the positive-electrode connection conductor part 50a is a position corresponding to the respective connection nodes 201 in the circuit diagram of FIG. 2, and the respective resistances between the connections nodes are equal at r. In the case of the present example, the physical intervals between the respective connection pieces 71 are also equal. The distance from the positive-electrode first end 51 which is nearer the third external connection terminal 503 of the positive-electrode connection conductor part 50a until the positive-electrode-side external connection part 53 is suitable as the distance SD which was previously mentioned by referencing FIG. 1 (Pn is the number of lithium ion capacitors 20).

The configuration of the negative-electrode-side bus bar 60 is also substantially the same as the aforementioned positive-electrode-side bus bar 50. For this reason, the negative-electrode-side bus bar 60 will be briefly explained by showing the corresponding relationship with the positive-electrode-side bus bar 50. The negative-electrode-side bus bar 60 is configured by an negative-electrode-side external connection conductor part 60b and negative-electrode connection conductor part 60a which are parallel across the slit portions S4 and S3 corresponding to the slit portions S1 and S2 of the previously mentioned slit S. The slit S is divided into the slit portions S4 and S3 by being interrupted by the negative-electrode-side external connection part 63. In other words, the negative-electrode-side external connection conductor part 60b and negative-electrode connection conductor part 60a are electrically connected by this negative-electrode-side external connection part 63, and the physical relative positions of both are maintained. In the negative-electrode connection conductor part 60a, the connection pieces 71 are arranged in a line in the longitudinal direction from the negative-electrode first end 61 to the negative-electrode second end 62 at a side which cannot be seen in FIG. 8. The distance from the negative-electrode second end 62 nearer the second external terminal 502 of the negative-electrode connection conductor part 60a until the negative-electrode-side external connection part 63 is suitable as the distance SD previously mentioned by referencing FIG. 1 (Pn is the number of lithium ion capacitors 20).

The configuration of FIG. 8 is explained above by referencing together with the circuit diagram of FIG. 2. The positive-electrode-side bus bar 50 (positive-electrode connection conductor part 50a) extends in the parallel direction of the lithium ion capacitors 20 by connecting the respective positive-electrode terminals 101 of the plurality of the lithium ion capacitor 20 at equal intervals from the connection node 201 at the positive-electrode first end 51 until the connection node 201 at the positive-electrode second end 52, and the positive-electrode-side external connection part 33 is set at the position SD separated from the one end 51 (positive-electrode first end 51 on side of first one lithium ion capacitor 20) by a range of 20% to 30% of the overall length in the longitudinal direction of itself. In addition, the negative-electrode-side bus bar 60 (negative-electrode connection conductor part 60a) extends in the parallel direction by connecting the respective negative-electrode terminals 102 of the plurality of lithium ion capacitors 20 at equal intervals from the connection node 202 at one end of itself until the connection node 202 of the other end 62, and the negative-electrode-side external connection part 63 is set at the position SD separated from the negative-electrode second end 62 (negative-electrode second end 62 on side of $n^{th}$ one lithium ion capacitor 20) by the range of 20% to 30% of the overall length in the longitudinal direction of itself. It should be noted that the connection pieces 71 correspond to the respective connection nodes 201 and connection nodes 202 in an electrically manner, respectively.

Figure 9:
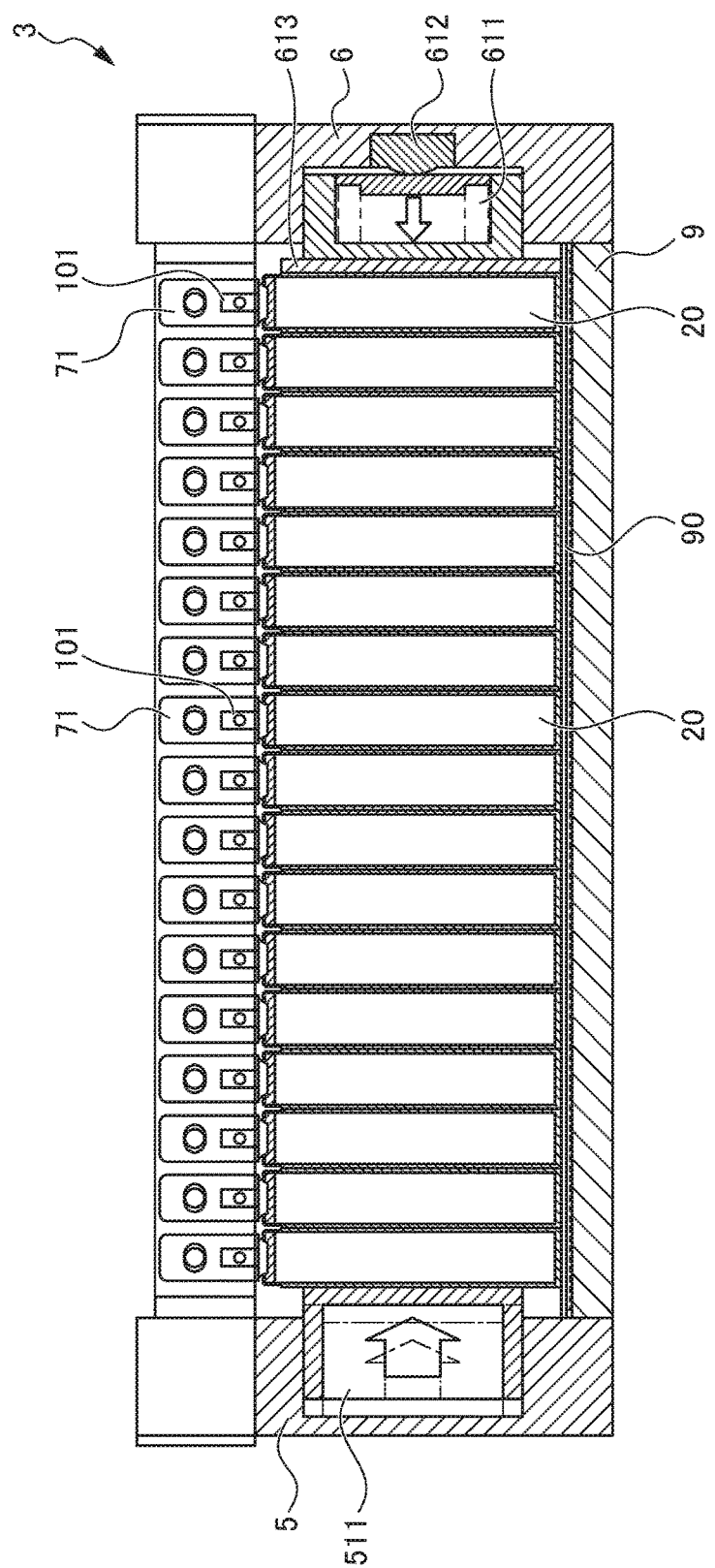
FIG. 9 is a detail drawing of a lateral cross-sectional view of the capacitor-type power supply unit in FIG. 5.
Figure 10:
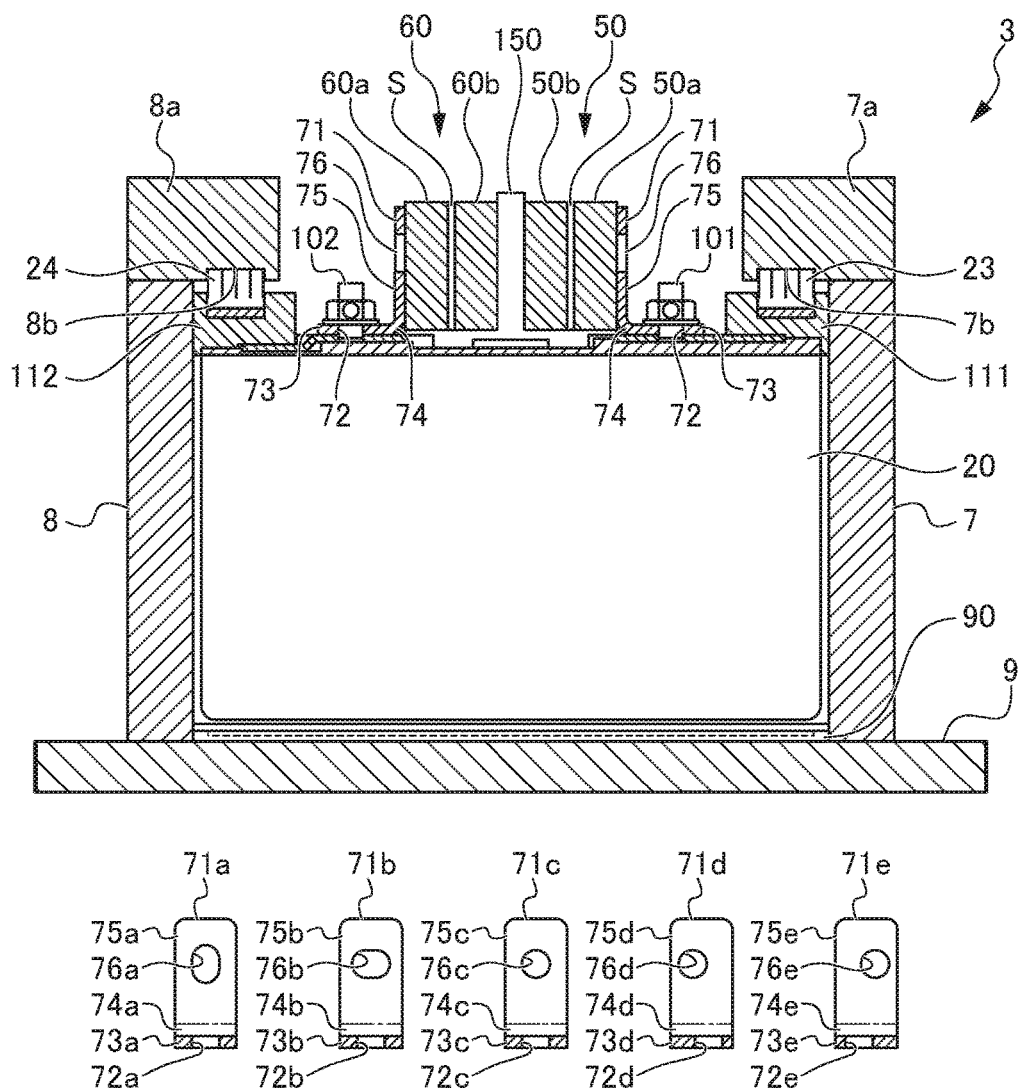
FIG. 10 is a detail drawing of a cross section in the lamination direction (parallel direction) of electrical storage devices of the capacitor-type power supply unit of FIG. 5.

FIG. 9 is a detail drawing of a lateral cross-sectional view of the capacitor-type power supply unit in FIG. 5. FIG. 10 is a detail drawing of a cross section in the lamination direction (parallel direction) of capacitors of the capacitor-type power supply unit of FIG. 5. The capacitor-type power supply unit in FIGS. 9 and 10 has some differences besides the point of the precise shape of the water jacket 90 and one end plate 5 and other end plate 6 from those in FIGS. 5 and 6; however, it is substantially the same device based on the same design philosophy. In FIGS. 9 and 10, the same reference symbols are attached to corresponding parts with the previously mentioned FIGS. 5 and 6.

According to FIG. 9, a pressurization mechanism 511 is provided by fluid or an elastic body to the one end plate 5 of the housing 3. On the lithium ion capacitors 20, the pressurization mechanism 511 is always pressurizing these in the lamination direction. Also to the other end plate 6 of the housing 3, a pressurization mechanism 611 is provided by an elastic body such that is suited to the pressurization mechanism 511. At the other end plate 6, a load cell 612 is further provided as a pressure sensor for detecting the pressure force by the pressurization mechanism 511 and pressurization mechanism 611. Based on the detection output of the load cell 612, a servo mechanism (not illustrated) operates, and the pressure force is adjusted as appropriate by the pressurization mechanism 511 and pressurization mechanism 611. It should be noted that the movement range of the pressurization mechanism 511 and pressurization mechanism 611 themselves may be small values, and it may be configured so as to insert, between a pressing end of the pressurization mechanism 611 and a lateral face of the lithium ion capacitor 20 opposing this, a shim 613 by appropriately selecting the thickness and number thereof. Optimization of the arrangement of lithium ion capacitors 20 and the appropriate pressing force by the pressurization mechanism 511 and pressurization mechanism 611 are thereby realized.

According to such a configuration, the positions of the lithium ion capacitors 20 are appropriately retained by the pressure force in the lamination direction of these being appropriately maintained even when several of the lithium ion capacitors 20 repeat expansion and contraction due to temperature fluctuations during operation. In addition, by way of such a pressure force, the heat transfer to the water jacket 90 by the copper plate 21 and heat transfer sheet 2 as a soaking sheet explained by referencing FIG. 7 is appropriately achieved, and the cooling function on the lithium ion capacitors 20 is maintained.

In addition, according to FIG. 10, a top retaining member 7a and top retaining member 8a are provided to tops of a side plate 7 and side plate 8, respectively. The top retaining member 7a and top retaining member 8a are provided over substantially the entire length along the longitudinal direction of the side plate 7 and side plate 8. At the lower surface of a portion at which the top retaining member 7a and top retaining member 8a overhang to the inside of the housing 3 from the top of each side plate 7 and side plate 8, respectively, a screw receiving part 7b and screw receiving part 8b are provided. Elastic bodies (coil springs) 23, 24 are interposed between this spring receiving part 7b and spring receiving part 8b and each set piece 111, 112 provided at an upper shoulder of the lithium ion capacitor 20. By the repulsive force by these elastic bodies 23, 24, the lithium ion capacitors 20 are always pressed towards the bottom plate 9 (water jacket 90 on the bottom plate 9) of the housing 3.

For this reason, for the lithium ion capacitors 20, in addition to the positioning and pressing in the lamination direction (longitudinal direction within the housing 3) being performed by the pressurization mechanism explained by referencing FIG. 9, positioning and pressing is performed in a direction intersecting the lamination direction. Therefore, the lithium ion capacitors 20 are thermally joined sufficiently with the water jacket 90, and appropriate cooling is performed.

The positive-electrode-side bus bar 50 and negative-electrode-side bus bar 60 such as those mentioned previously are arranged in a vertical direction to the sheet plane of FIG. 10, above the center of the lithium ion capacitors 20. The positive-electrode-side bus bar 50 is segmented into the positive-electrode-side external connection conductor part 50b and positive-electrode connection conductor part 50a by the slit S. Similarly, the negative-electrode-side bus bar 60 is segmented into the negative-electrode-side external connection conductor part 60b and negative-electrode connection conductor part 60a by the slit S. Between the positive-electrode-side bus bar 50 and negative-electrode-side bus bar 60, i.e. between the positive-electrode-side external connection conductor part 50b and negative-electrode-side external connection conductor part 60b, is insulated by an insulating member 150.

The second contact plate part 75 of the connection piece 71 contacts the positive-electrode connection conductor part 50a and negative-electrode connection conductor part 60a, respectively. In addition, the first contact plate part 73 of the connection piece 71 is fastened to a nut with the bolt-like positive-electrode terminal 101 and negative-electrode terminal 102 of the lithium ion capacitor 20 which penetrate through the through-hole 72. The positive-electrode connection conductor part 50a and negative-electrode connection conductor part 60a thereby exceptionally connect in parallel the positive-electrode terminal 101 and negative-electrode terminal 102 of the lithium ion capacitors 20.

The variations of connection pieces 71 are shown at the bottom of FIG. 10. In these variations, the respective connection pieces 71a, 71b, 71c, 71d 71e, and for the through-hole 72, first contact plate part 73, folded part 74, second contact plate part 75 and through-hole 76 of these are illustrated by attaching a, b, c, d, e to the end of the reference symbols of these. According to the illustration, the respective connection pieces 71a, 71b, 71c, 71d, 71e make the positions of the through-holes 72a, 72b, 72c, 72d, 72d of the respective first contact plate parts 73a, 73b, 73c, 73d, 73e of these different. Furthermore, the respective connection pieces 71a, 71b, 71c, 71d, 71e make the shape and positions of the through-holes 76a, 76b, 76c, 76d, 76e of each of the second contact plate parts 75a, 75b, 75c, 75d, 75e of these difference. By properly using the connection pieces 71 having such variations according to the sequential order in the arrangement of these, it becomes possible to flexibly comply with the displacement in position and/or dimensions of the positive-electrode terminal 101 and negative-electrode terminal 102 of the lithium ion capacitors 20 due to fluctuation in temperature, and further, the tolerance in manufacture.

Also in the capacitor-type power supply unit 1a as another embodiment of the present invention explained by referencing FIGS. 5 to 10, the positive-electrode-side external connection part 53 and negative-electrode-side external connection part 63 of the positive-electrode-side bus bar 50 and negative-electrode-side bus bar 60 are provided at the aforementioned such position SD, as explained by referencing FIG. 8. Equal dividing of electric current flowing to the individual lithium ion capacitors 20 connected in parallel is achieved, upon a large electric current flowing through the positive-electrode-side external connection part 53 and negative-electrode-side external connection part 63, and further through the positive-electrode-side external connection conductor part 50b and negative-electrode-side external connection conductor part 60b. For this reason, the aging deterioration of the individual lithium ion capacitors 20 which are electrical storage devices becomes substantially equal, and it becomes possible to extend the service life as a capacitor-type power supply unit.

In addition, the capacitor-type power supply unit 1a as another embodiment of the present invention is a capacitor-type power supply unit in which a plurality of first to $n^{th}$ (n is 17 in present embodiment) lithium ion capacitors 10, which are electrical storage devices, are connected in parallel. The positive-electrode-side bus bar 50 (positive-electrode connection conductor part 50a) extends in the parallel direction of the lithium ion capacitor 20 by connecting the respective positive-electrode terminal 101 of the plurality of the lithium ion capacitors 20 at equal intervals from the connection node 201 at the positive-electrode first end 51 until the connection node 201 at the positive-electrode second end 52, and the positive-electrode-side external connection part 53 is set at position SD separated from the positive-electrode first end 51 (positive-electrode first end 51 on side of first lithium ion capacitor 20) by the range of 20% to 30% of the total length in the longitudinal direction of itself. In addition, the negative-electrode-side bus bar 60 (negative-electrode connection conductor part 60a) extends in the parallel direction by connecting the respective negative-electrode terminals 102 of the plurality of lithium ion capacitors 20 at equal intervals from the connection node 202 at one end of itself until the connection node 202 at the negative-electrode second end 62, and the negative-electrode-side external connection part 63 is set at the position SD separated from the negative-electrode second end 62 (negative-electrode second end 62 on side of $17^{th}$ lithium ion capacitor 20) by the range of 20% to 30% of the total length in the longitudinal direction of itself.

By the positive-electrode-side external connection part 53 and negative-electrode-side external connection part 63 of the positive-electrode-side bus bar 50 (positive-electrode connection conductor part 50a) and negative-electrode-side bus bar 60 (negative-electrode connection conductor part 60a) being set at the aforementioned such position SD, equal dividing of electric current flowing to the individual lithium ion capacitors 20 connected in parallel is achieved, upon a large electric current flowing through the positive-electrode-side external connection part 53 and negative-electrode-side external connection part 63. For this reason, the aging deterioration of the individual lithium ion capacitors 20 which are electricals storage devices become substantially equal, and it becomes possible to extend the service life as a capacitor-type power supply unit.

Furthermore, the positive-electrode-side bus bar 50 and negative-electrode-side bus bar 60 are configured in the form such as that explained by referencing FIG. 8; therefore, even if connecting with an external circuit by an external terminals (501, 502, 503, 504) which electrically conduct with the positive-electrode-side external connection conductor part 50b and negative-electrode-side external connection conductor part 60b, the equal dividing of electric current flowing to the lithium ion capacitors 20 is maintained. For example, with the capacitor-type power supply unit 1a as one power supply unit, a case is assumed of configuring a serial power unit by connecting three of these in series. In this case, the first to third of the capacitor-type power supply units 1a are connected in series. The first external connection terminal 501 (or third external connection terminal 503) of a first of the capacitor-type power supply units 1a is defined as the external connection terminal on the positive-electrode-side of the serial power unit, and the fourth external connection terminal 504 (or second external connection terminal 502) of a third of the capacitor-type power supply units 1a is defined as the external connection terminal on the negative-electrode-side of the serial power unit. To perform serial connection, the fourth external connection terminal 504 (or second external connection terminal 502) of the first of the capacitor-type power supply units 1a and the first external connection terminal 501 (or third external connection terminal 503) of the second of the capacitor-type power supply units 1a are connected. Furthermore, the fourth external connection terminal 504 (or second external connection terminal 502) of the second of the capacitor-type power supply units 1a and the first external connection terminal 501 (or third external connection terminal 503) of the third of the capacitor-type power supply units 1a are connected. Even in the case of configuring a serial power unit with the capacitor-type power supply unit 1a as one power supply unit, and connecting three of these in series, the respective external terminals (501, 502, 503, 504) will electrically conduct physically to the positive-electrode-side external connection conductor part 50a and negative-electrode-side external connection conductor part 60b of the previously mentioned configuration. Therefore, the equal dividing of electric current flowing to the lithium ion capacitors 20 is also maintained in such a case, and the lifespans of the lithium ion capacitors 20 as constituent elements of the serial power unit become equal; therefore, the service life as a whole is extended.

In addition, with the capacitor-type power supply unit 1a as another embodiment of the present invention, the plurality of electrical storage devices are lithium ion capacitors or a serial connection body thereof. For this reason, by way of being superior in high temperature durability performance and equalization of the service life of the individual electrical storage devices, the extension of the service life as a capacitor-type power supply unit is realized as a result.

It should be noted that the present invention is not to be limited to the above-mentioned embodiment, and that modifications, improvements, etc. within a scope that can achieve the objects of the present invention are also included in the present invention. For example, it is not limited to a case of the aforementioned plurality of electrical storage devices necessarily being lithium ion capacitors, and may be a rechargeable battery or a serial connection body thereof. Also in this case, equal dividing of charge/discharge current of the individual rechargeable batteries connected in parallel to constitute the electrical storage device or a serial connection body thereof is achieved, and by equalization of the service life of individual electrical storage devices, extension of the service life as a capacitor-type power supply unit is realized as a result.

In the above, a case of constituting one capacitor-type power supply unit by connecting the lithium ion capacitors in parallel was explained in detail. Next, technology for a case of serially connecting a plurality of capacitor-type power supply units configured in the way previously mentioned will be explained.

Figure 11:
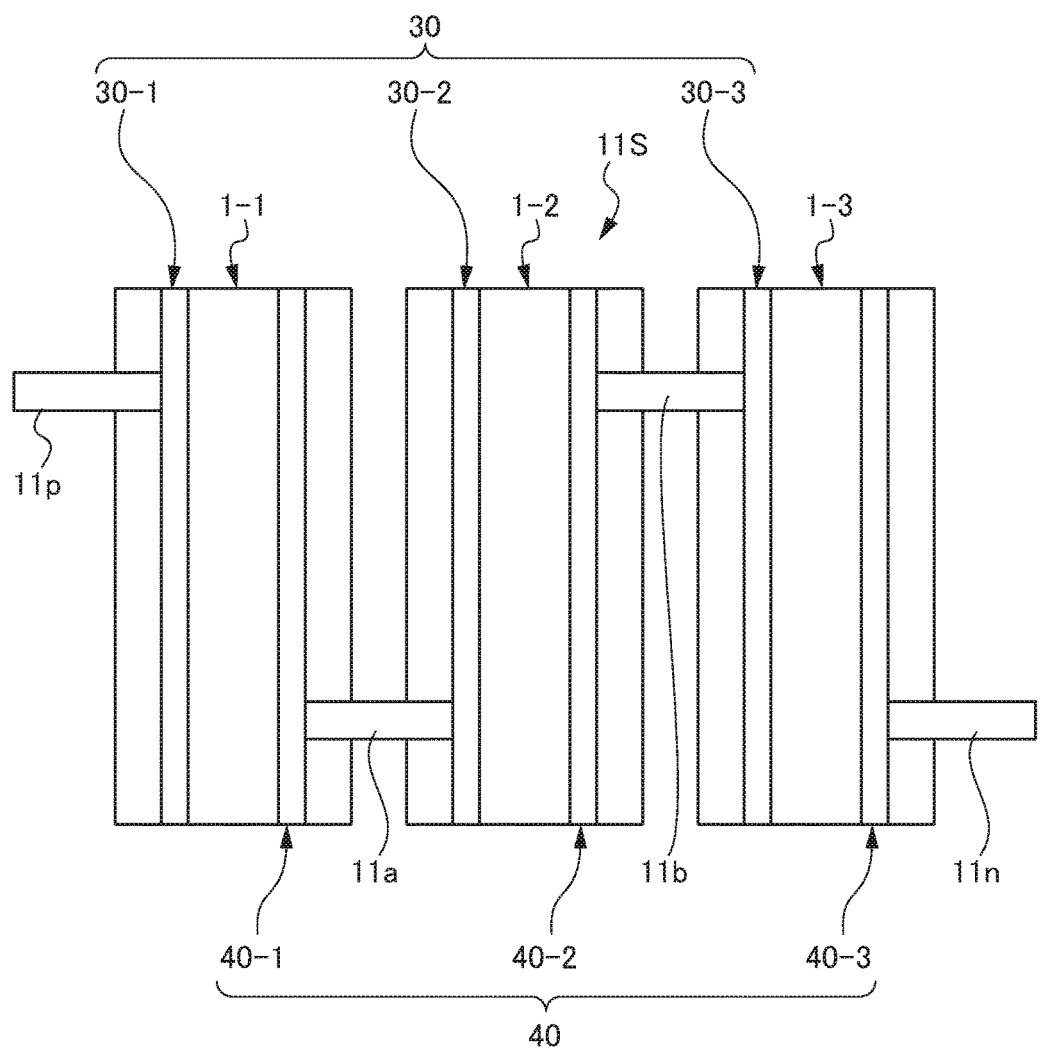
FIG. 11 is a conceptual diagram showing a serial connection body in which three capacitor-type power supply units which are substantially the same as the capacitor-type power supply unit of FIG. 1 are connected in series.
Figure 12:
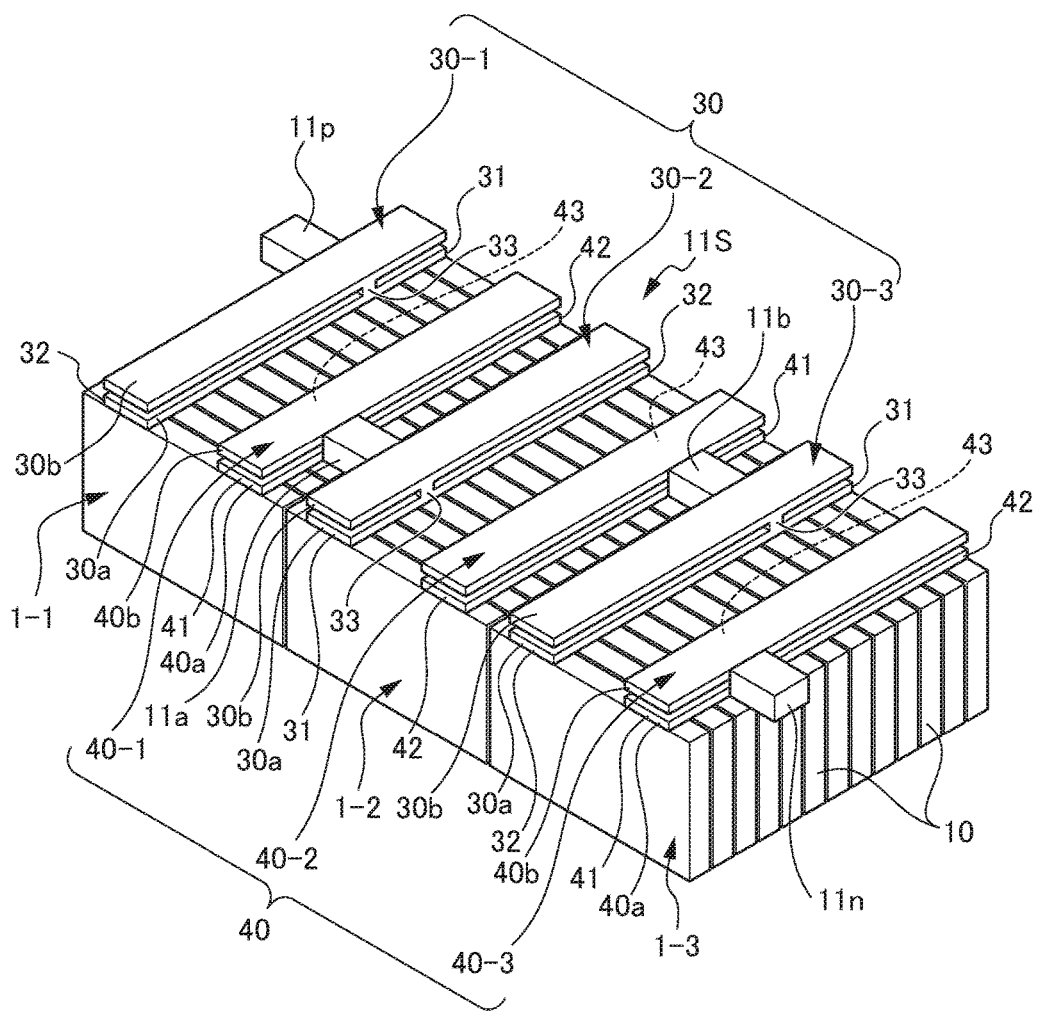
FIG. 12 is a perspective view showing a schematic block diagram of the serial connection body in FIG. 11.

FIG. 11 is a conceptual drawing showing a serial connection body made by serially connecting three capacitor-type power supply units which are substantially the same as the capacitor-type power supply unit explained by referencing FIG. 1. FIG. 12 is a perspective view showing a schematic block diagram of the serial connection body in FIG. 11. In FIGS. 11 and 12, the three capacitor-type power supply units 1-1, 1-2 and 1-3 constituting the serial connection body 11S each have a plurality of lithium ion capacitors 10, and positive-electrode-side bus bars 30 (30-1, 30-2, 30-3) and negative-electrode-side bus bars 40 (40-1, 40-2, 40-3) connecting these in parallel.

The positive-electrode-side bus bar 30 is common in the point of the positive-electrode connection conductor part 30a and positive-electrode-side external connection conductor part 30b aligned in parallel are connected by the positive-electrode-side external connection part 33, similarly to the positive-electrode-side bus bar 30 in FIG. 1. In the case of FIG. 12, in order to serially connect the three capacitor-type power supply units 1-1, 1-2 and 1-3, the positive-electrode-side bus bar 30 can adopt two types depending on at which end the position of the positive-electrode-side external connection part 33 biases. In other words, in the first type, the position of the positive-electrode-side external connection part 33 is right biased from the center in the longitudinal direction of the positive-electrode-side bus bar 30 in the vantage point of FIG. 12. In the second type, the position of the positive-electrode-side external connection part 33 is left biased from the center in the longitudinal direction of the positive-electrode-side bus bar 30 in the vantage point of FIG. 12. The first positive-electrode-side bus bar 30-1 and the second positive-electrode-side bus bar 30-3 correspond to the first type, and the positive-electrode-side bus bar 30-2 corresponds to the second type. When referencing FIG. 12 together with FIG. 1, in the positive-electrode-side bus bar 30 of the first type, the separation distance SD from the positive-electrode first end 31 to the positive-electrode-side external connection part 33 is set by viewing the right side in FIG. 12 as the positive-electrode first end 31 side. In addition, in the positive-electrode-side bus bar 30 of the second type, the separation distance SD from the positive-electrode first end 31 to the positive-electrode-side external connection part 33 is set by viewing the left side in FIG. 12 as the positive-electrode first end 31 side.

The negative-electrode-side bus bar 40 is also common in the point of the negative-electrode connection conductor part 40a and negative-electrode-side external connection conductor part 40b which are aligned in parallel being connected by the negative-electrode-side external connection part 43, similarly to the negative-electrode-side bus bar 40 in FIG. 1. In the case of FIG. 12, in order to serially connect the three capacitor-type power supply units 1-1, 1-2 and 1-3, the negative-electrode-side bus bar 40 can adopt two types depending on at which end the position of the negative-electrode-side external connection part 43 is biased. In other words, in the first type, the position of the negative-electrode-side external connection part 43 is left biased from the center in the longitudinal direction of the negative-electrode-side bus bar 40 in the vantage point of FIG. 12. In the second type, the position of the negative-electrode-side external connection part 43 is right biased from the center in the longitudinal direction of the negative-electrode-side bus bar 40 in the vantage point of FIG. 12. The first negative-electrode-side bus bar 40-1 and the second negative-electrode-side bus bar 40-3 correspond to the first type, and the negative-electrode-side bus bar 40-2 corresponds to the second type. Also for the negative-electrode-side bus bar 40, when referencing FIG. 12 together with FIG. 1, the separation distance SD from the negative-electrode first end 41 until the negative-electrode-side external connection part 43 in the negative-electrode-side bus bar 40 of the first type is set by viewing the left side in FIG. 12 as the negative-electrode first end 41 side. In addition, with the negative-electrode-side bus bar 40 of the second type, the separation distance SD from the negative-electrode first end 41 until the negative-electrode-side external connection part 43 is set by viewing the right side in FIG. 12 as the negative-electrode first end 41 side.

The first positive-electrode-side bus bar 30-1 and the first negative-electrode-side bus bar 40-1 are conductors which link the respective lithium ion capacitors 10 of the capacitor-type power supply unit 1-1 in parallel. In addition, the third positive-electrode-side bus bar 30-2 and the third negative-electrode-side bus bar 40-2 are conductors which link the respective lithium ion capacitors 10 of the capacitor-type power supply unit 1-2 in parallel. In addition, the positive-electrode-side bus bar 30-3 and negative-electrode-side bus bar 40-3 are conductors which link the respective lithium ion capacitors 10 of the capacitor-type power supply unit 1-3 in parallel.

The first negative-electrode-side bus bar 40-1 of the capacitor-type power supply unit 1-1 and the third positive-electrode-side bus bar 30-2 of the capacitor-type power supply unit 1-2 are connected by a first coupling connection conductor 11a, and the negative-electrode-side bus bar 40-2 of the capacitor-type power supply unit 1-2 and the positive-electrode-side bus bar 30-3 of the capacitor-type power supply unit 1-3 are connected by a connection conductor 11b. In addition, in the first serial connection body 11S, the positive-electrode-side output conductor 11p is led out from the first positive-electrode-side bus bar 30-1 of the capacitor-type power supply unit 1-1, and the negative-electrode-side output conductor 11n is led out from the negative-electrode-side bus bar 40-3 of the capacitor-type power supply unit 1-3. In the first serial connection body 11S, the capacitor-type power supply units 1-1, 1-2 and 1-3 are serially connected by the first coupling connection conductor 11a and the second coupling connection conductor 11b.

In the first serial connection body 11S, the first coupling connection conductor 11a is provided between a site corresponding to the negative-electrode-side external connection part 43 of the first negative-electrode-side bus bar 40-1, and a site corresponding to the positive-electrode-side external connection part 33 of the positive-electrode-side bus bar 30-2. Similarly, the second coupling connection conductor 11b is provided between a site corresponding to the negative-electrode-side external connection part 43 of the third negative-electrode-side bus bar 40-2 and a site corresponding to the positive-electrode-side external connection part 33 of the second positive-electrode-side bus bar 30-3. In addition, the first positive-electrode-side output conductor 11p is provided at a site corresponding to the positive-electrode-side external connection part 33 of the positive-electrode-side bus bar 30-1. In addition, the negative-electrode-side output conductor 11n is provided at a site corresponding to the negative-electrode-side external connection part 43 of the second negative-electrode-side bus bar 40-3.

In the first serial connection body 11S of FIGS. 11 and 12, the first positive-electrode-side bus bar 30-1 and the second positive-electrode-side bus bar 30-3 of the first type and the third positive-electrode-side bus bar 30-2 of the second type are arranged in the aforementioned way as the positive-electrode-side bus bars 30. In addition, the first negative-electrode-side bus bar 40-1 and the second negative-electrode-side bus bar 40-3 of the first type and the third negative-electrode-side bus bar 40-2 of the second type are arranged in the aforementioned way as the negative-electrode-side bus bars 40. In accordance with these arrangements, the first coupling connection conductor 11a and the second coupling connection conductor 11b are provided so as to join the site corresponding to the positive-electrode-side external connection part 33 of the positive-electrode-side bus bar 30 and the site corresponding to the negative-electrode-side external connection part 43 of the negative-electrode-side bus bar 40. The equal dividing of electric current of the lithium ion capacitors 10 constituting the respective capacitor-type power supply units 1-1, 1-2 and 1-3 is thereby achieved, as explained by referencing FIGS. 1 to 4. Therefore, the aging deterioration of the individual lithium ion capacitors 10 becomes substantially equal, whereby it becomes possible to extend the service life as a capacitor-type power supply unit. Furthermore, the three capacitor-type power supply units 1-1, 1-2 and 1-3 are serially connected by the first coupling connection conductors 11a, the second coupling connection conductors 11b by the shortest path, while maintaining the aforementioned functional effect, which is advantageous in size reduction, weight savings and suppressing the loss of electric power.

Figure 13:
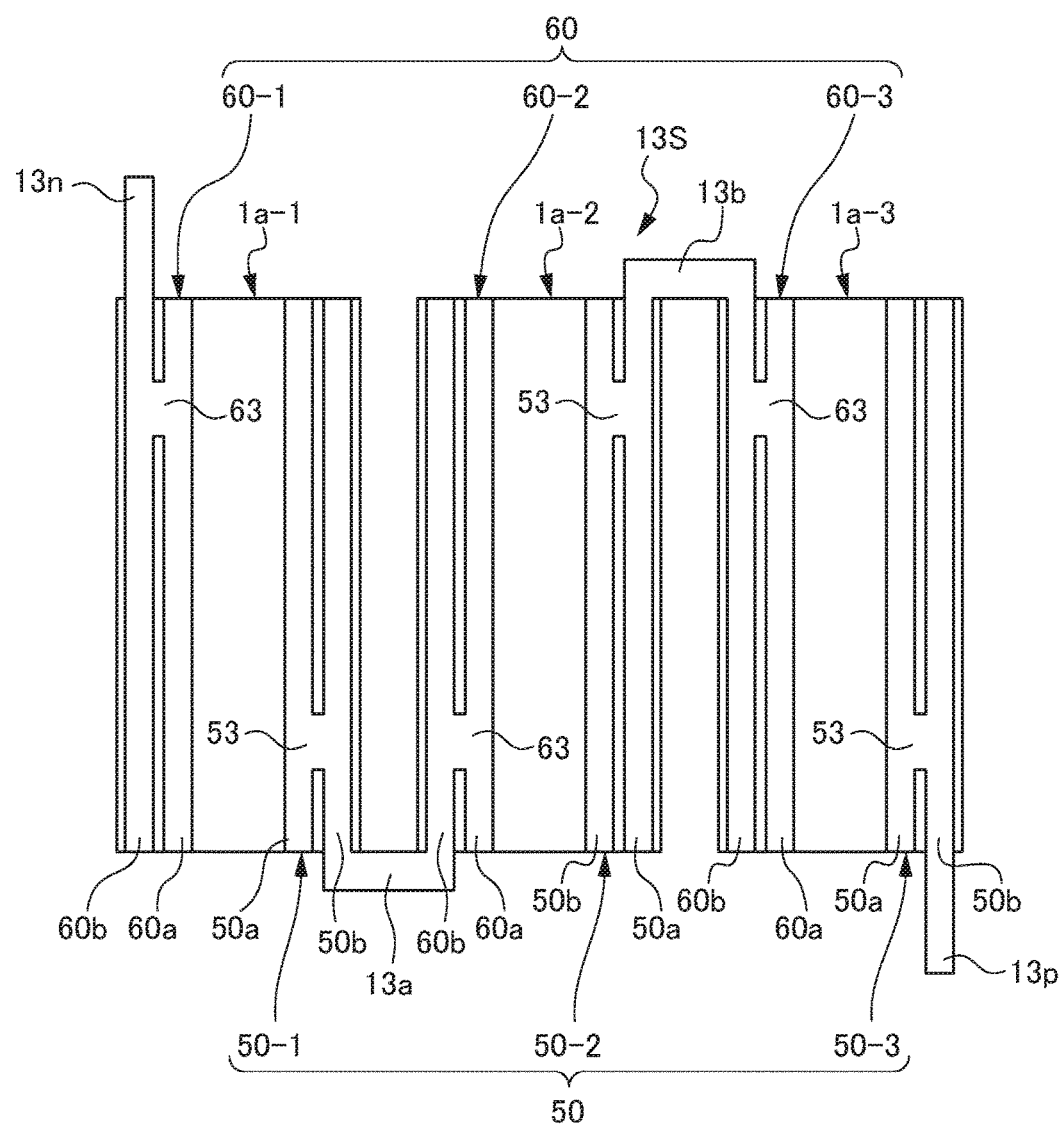
FIG. 13 is a conceptual diagram showing a serial connection body in which three capacitor-type power supply units which are substantially the same as the capacitor-type power supply unit of FIGS. 5 to 7 are connected in series.
Figure 14:
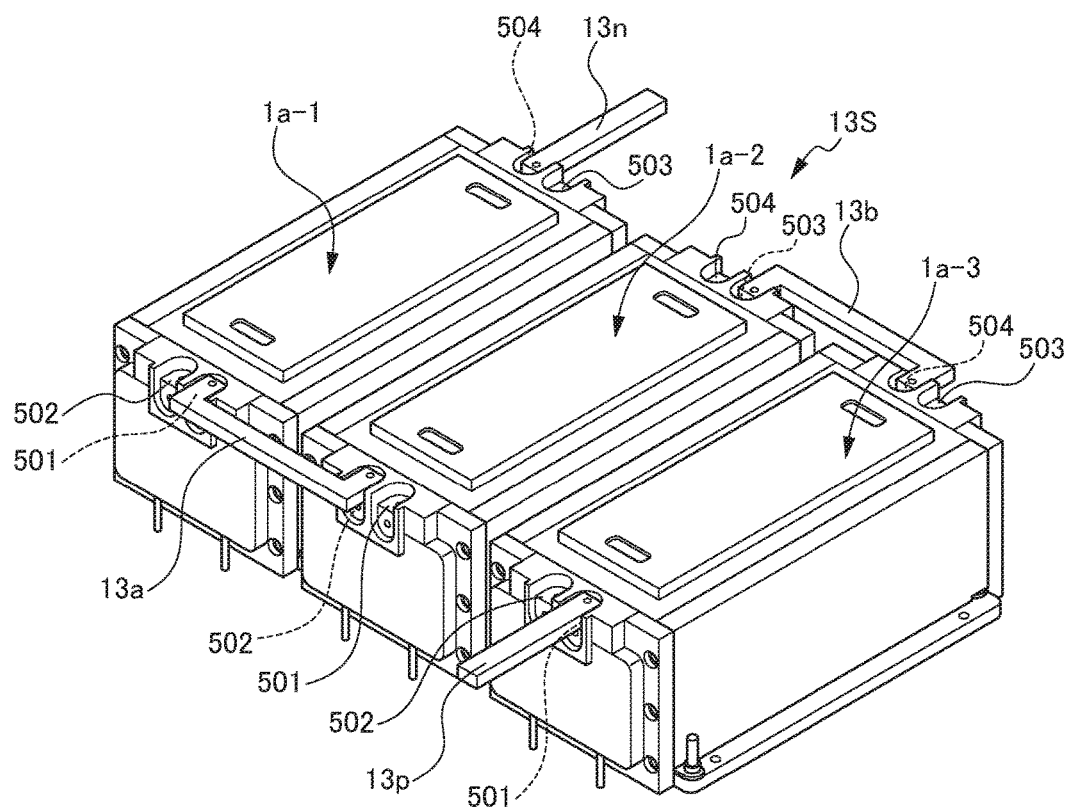
FIG. 14 is a perspective view showing a schematic block diagram of the serial connection body in FIG. 13.

FIG. 13 is a conceptual diagram showing a serial connection body in which three capacitor-type power supply units which are substantially the same as the capacitor-type power supply unit explained by referencing FIGS. 5 to 7 are serially connected. FIG. 14 is a perspective view showing a schematic block diagram of the serial connection body in FIG. 13. In FIGS. 13 and 14, the three capacitor-type power supply units 1a-1, 1a-2 and 1a-3 constituting the serial connection body are configured to have a plurality of lithium ion capacitors 20 (refer to FIG. 6 for details), and the positive-electrode-side bus bar 50 (50-1, 50-2, 50-3) and negative-electrode-side bus bar 60 (60-1, 60-2, 60-3) connecting these in parallel. The positive-electrode-side bus bar 50 and negative-electrode-side bus bar 60 are substantially the same as the bus bars explained by referencing FIG. 8. In other words, in the positive-electrode-side bus bar 50, the positive-electrode connection conductor part 50a and positive-electrode-side external connection conductor part 50b are connected by the positive-electrode-side external connection part 53. In addition, in the negative-electrode-side bus bar 60, the negative-electrode connection conductor part 60a and negative-electrode-side external connection conductor part 60b are connected by the negative-electrode-side external connection part 63.

The end that is relatively closer to the positive-electrode-side external connection part 53 of the fourth positive-electrode-side bus bar 50-1 in the capacitor-type power supply unit 1a-1 and the end that is relatively closer to the negative-electrode-side external connection part 63 of the fifth negative-electrode-side bus bar 60-2 in the capacitor-type power supply unit 1a-2 are connected by the third coupling connection conductor 13a. In addition, the end that is relatively closer to the positive-electrode-side external connection part 53 of the fifth positive-electrode-side bus bar 50-2 in the capacitor-type power supply unit 1a-2 and the end that is relatively closer to the negative-electrode-side external connection part 63 of the sixth negative-electrode-side bus bar 60-3 in the capacitor-type power supply unit 1a-2 are connected by the connection conductor 13b. In the aforementioned such form, the capacitor-type power supply units 1a-1, 1a-2 and 1a-3 are serially connected by the third coupling connection conductor 13a and the fourth coupling connection conductor 13b, whereby a second serial connection body 13S made by serially connecting three of the capacitor-type power supply units is configured. In this form, the negative-electrode-side output conductor 13n is led out from the end which is relatively closer to the negative-electrode-side external connection part 63 of the negative-electrode-side external connection conductor part 60b in the fourth negative-electrode-side bus bar 60-1 of the capacitor-type power supply unit 1a-1. In addition, the positive-electrode-side output conductor 13p is led out from the end which is relatively closer to the positive-electrode-side external connection part 53 of the positive-electrode-side external connection conductor part 50b in the sixth positive-electrode-side bus bar 50-3 of the capacitor-type power supply unit 1a-3.

For the second serial connection body 13S conceptually shown in FIG. 13, an example of this external appearance thereof is shown in the perspective view of FIG. 14. As mentioned above, the capacitor-type power supply units 1a-1, 1a-2 and 1a-3 constituting the second serial connection body 13S are substantially the same as the capacitor-type power supply unit explained by referencing FIGS. 5 to 7, and have the first external connection terminal 501 and third external connection terminal 503 as the positive-electrode terminals, and the second external connection terminal 502 and fourth external connection terminal 504 as the negative-electrode terminals. The previously mentioned the third coupling connection conductor 13a by referencing FIG. 13 is connected so as to join between the first external connection terminal 501 of the capacitor-type power supply unit 1a-1 and the second external connection terminal 502 of the capacitor-type power supply unit 1a-2. In addition, the fourth coupling connection conductor 13b is connected so as to join between the third external connection terminal 503 of the capacitor-type power supply unit 1a-2 and the fourth external connection terminal 504 of the capacitor-type power supply unit 1a-3. Furthermore, the negative-electrode-side output conductor 13n is connected to the fourth external connection terminal 504 of the capacitor-type power supply unit 1a-1, and the positive-electrode-side output conductor 13p is connected to the first external connection terminal 501 of the capacitor-type power supply unit 1a-3. Due to configuring the second serial connection body 13S by serially connecting the capacitor-type power supply units 1a-1, 1a-2 and 1a-3 in the form such as explained by referencing FIGS. 13 and 14, the third coupling connection conductor 13a and the fourth coupling connection conductor 13b become the shortest, which is advantageous in size reduction, weight savings and suppressing loss of electric power. In addition, as in the first serial connection body 11S explained by referencing FIGS. 11 and 12, the equal dividing of electric current flowing to the lithium ion capacitors 20 is maintained, and the lifespans of the lithium ion capacitors 20 as the constituent elements of the serial power unit become equal; therefore, the service life as a whole is extended.

Figure 15:
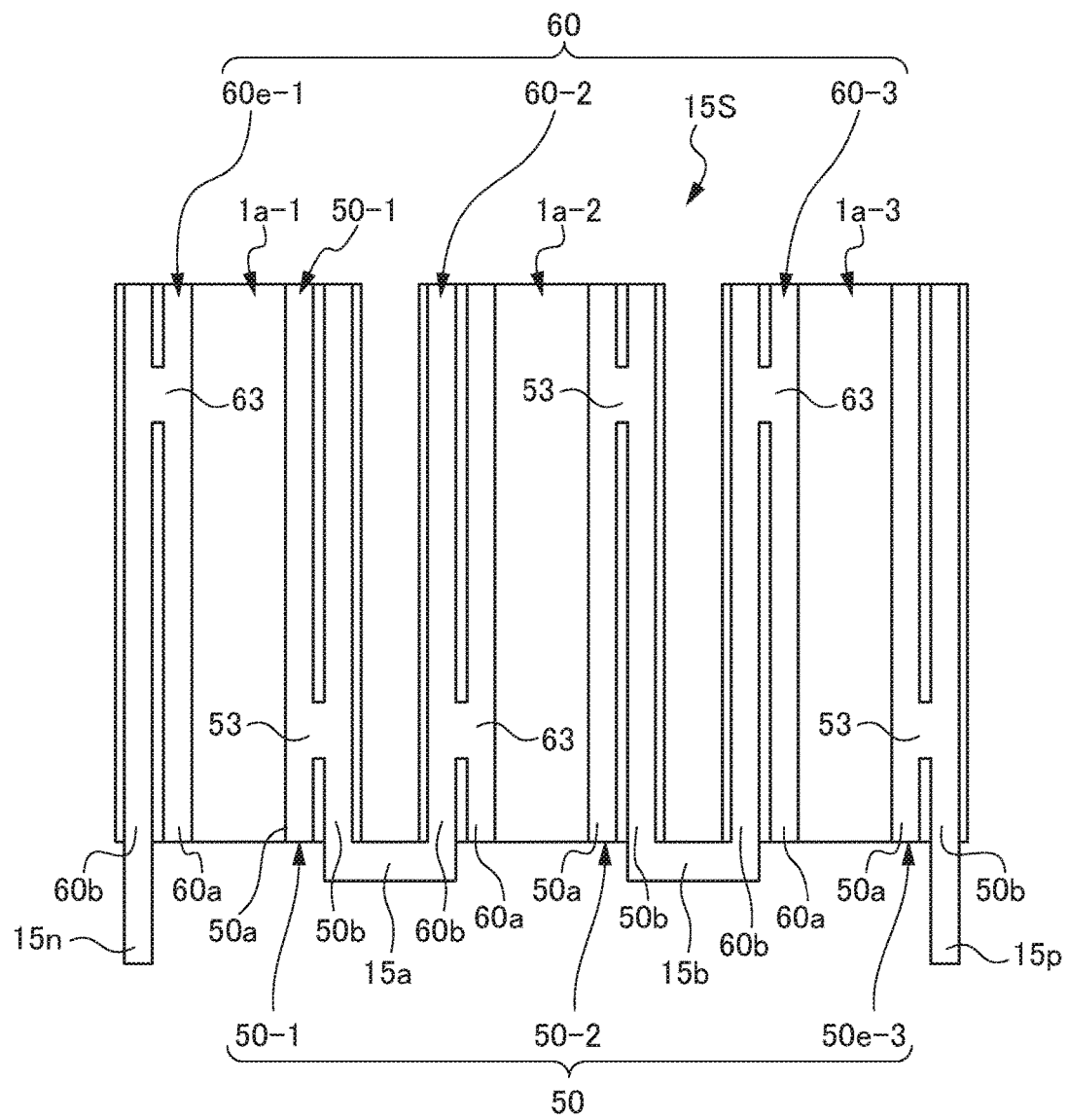
FIG. 15 is a conceptual diagram showing a serial connection body in which three capacitor-type power supply units which are substantially the same as the capacitor-type power supply unit of FIG. 3 are connected in series.
Figure 16:
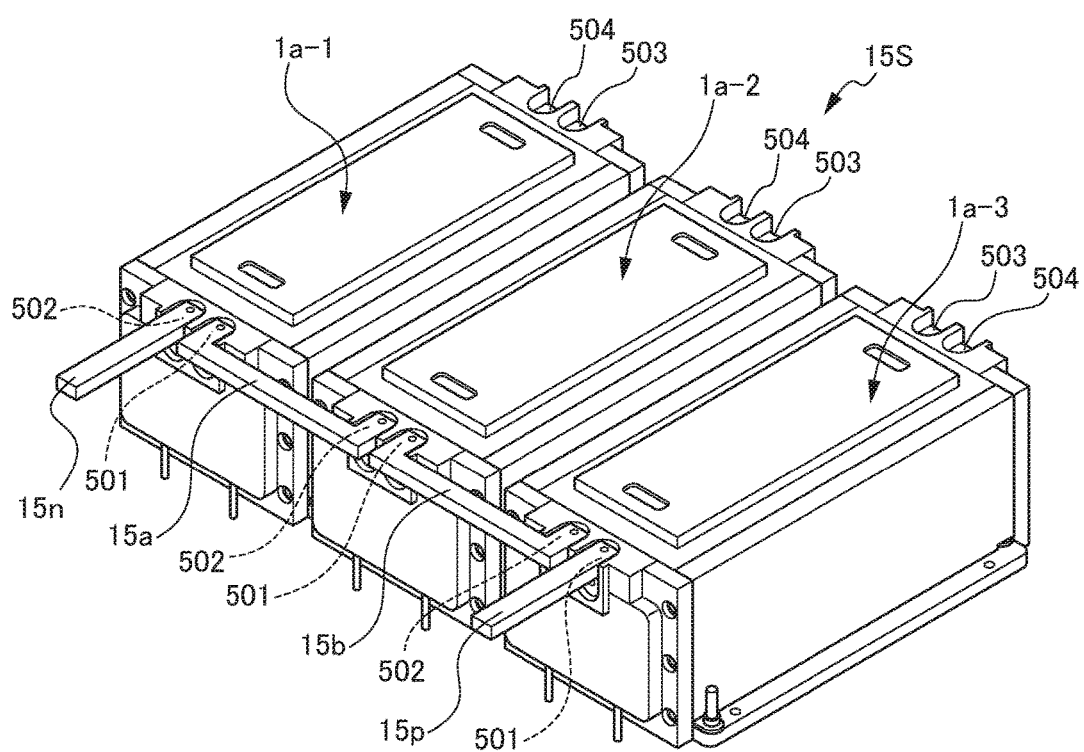
FIG. 16 is a perspective view showing a schematic block diagram of the serial connection body in FIG. 15.

FIG. 15 is a conceptual diagram showing a serial connection body in which three capacitor-type power supply units, which are substantially the same as the capacitor-type power supply unit explained by referencing FIGS. 5 to 7, are connected in series. FIG. 16 is a perspective view showing a schematic block diagram of the serial connection body in FIG. 15. One point of difference between the third serial connection body 15S In FIGS. 15 and 16 and the second serial connection body 13S mentioned previously by referencing FIGS. 13 and 14 is the lead positions of the negative-electrode-side external connection conductor 15n and positive-electrode-side external connection terminal 15p. Specifically, in the third serial connection body 15S, the lead positions of the negative-electrode-side external connection conductor 15n and the positive-electrode-side external connection terminal 15p are opposite sides in the longitudinal direction of the capacitor-type power supply units 1a-1, 1a-2 and 1a-3; whereas, in the third serial connection body 15S, the lead positions of the negative-electrode-side external connection conductor 15n and the positive-electrode-side external connection terminal 15p are at the same side in the longitudinal direction of the capacitor-type power supply units 1a-1, 1a-2 and 1a-3. Accompanying this, in the third serial connection body 15S, the connections of the fifth coupling connection conductors 15a and the sixth coupling connection conductors 15b for serially connecting the capacitor-type power supply units 1a-1, 1a-2 and 1a-3 are also performed on the same side in the longitudinal direction of the capacitor-type power supply units 1a-1, 1a-2 and 1a-3. In FIGS. 15 and 16, the corresponding parts with FIGS. 13 and 14 are attached the same reference symbols, and explanations mentioned previously are quoted.

In FIG. 15, the capacitor-type power supply unit 1a-1 has the negative-electrode-side bus bar 60e-1 and the fourth positive-electrode-side bus bar 50-1, and the negative-electrode-side output conductor 15n is led out from the end on a side relatively separated from the negative-electrode-side external connection part 63 of the negative-electrode-side external connection conductor part 60b in the negative-electrode-side bus bar 60e-1. In addition, the capacitor-type power supply unit 1a-3 has a sixth negative-electrode-side bus bar 60-3 and positive-electrode-side bus bar 50e-3, and the positive-electrode-side output conductor 15p is led out from the end on a side relatively close to the positive-electrode-side external connection part 53 of the positive-electrode-side external connection conductor part 50b in the positive-electrode-side bus bar 50e-3.

In the fourth positive-electrode-side bus bar 50-1 of the capacitor-type power supply unit 1a-1 and the fifth negative-electrode-side bus bar 60-2 of the capacitor-type power supply unit 1a-2 in the examples of FIGS. 15 and 16, the ends on the side relatively close from the positive-electrode-side external connection part 53 and negative-electrode-side external connection part 63 are joined by the fifth coupling connection conductor 15a. In contrast, in the fifth positive-electrode-side bus bar 50-2 of the capacitor-type power supply unit 1a-2 and the sixth negative-electrode-side bus bar 60-3 of the capacitor-type power supply unit 1a-3, the ends on the side relatively far from the positive-electrode-side external connection part 53 and negative-electrode-side external connection part 63 are joined by the connection conductor 15b. However, the connections by the fifth coupling connection conductors 15a and the sixth coupling connection conductor 15b are both performed by the external connection conductor parts (positive-electrode-side external connection conductor part 50b, negative-electrode-side external connection conductor part 60b); therefore, equal dividing of electric current of lithium ion capacitors connected in parallel is not inhibited as in the previously mentioned example, and since the lifespans of the lithium ion capacitors as constituent elements of the serial power units become equal, the service life as a whole is extended. In addition, the fifth coupling connection conductor 15a and the sixth coupling connection conductor 15b become the shortest, which is advantageous in size reduction, weight savings and suppressing loss of electric power.

Figure 17:
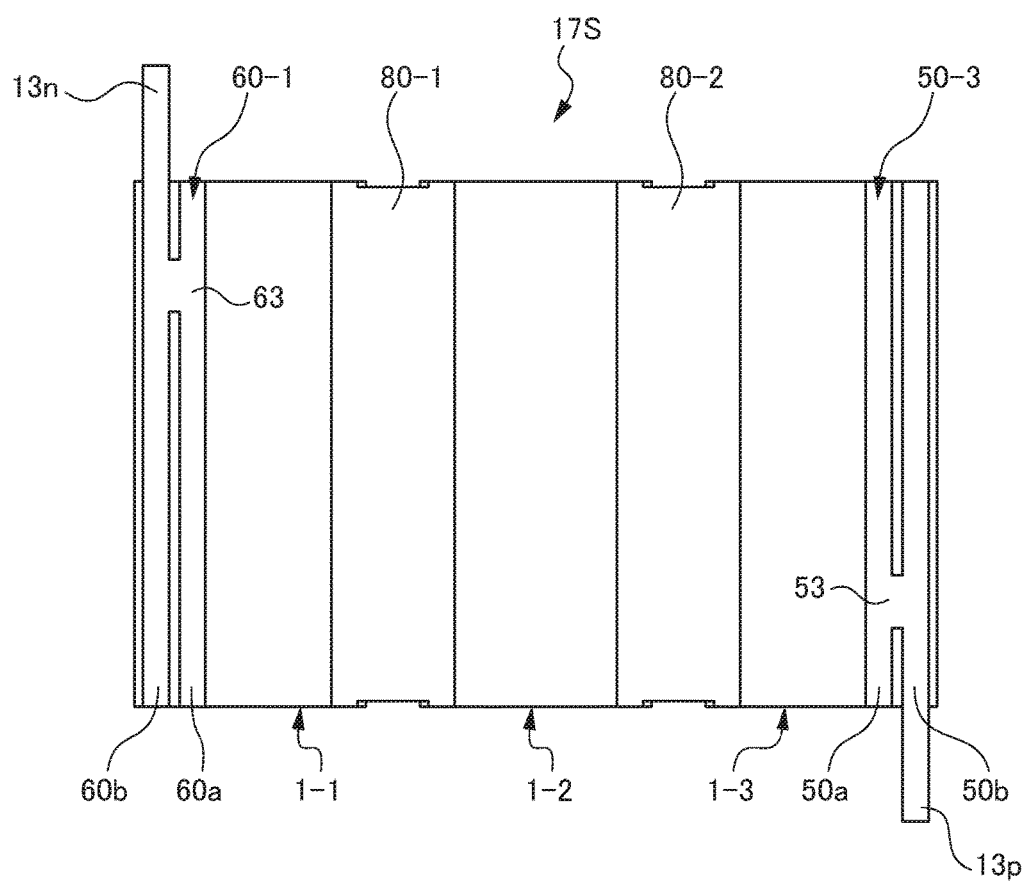
FIG. 17 is a conceptual diagram showing a serial connection body in which three capacitor-type power supply units which are substantially the same as the capacitor-type power supply unit of FIG. 1 are connected in series.
Figure 18:
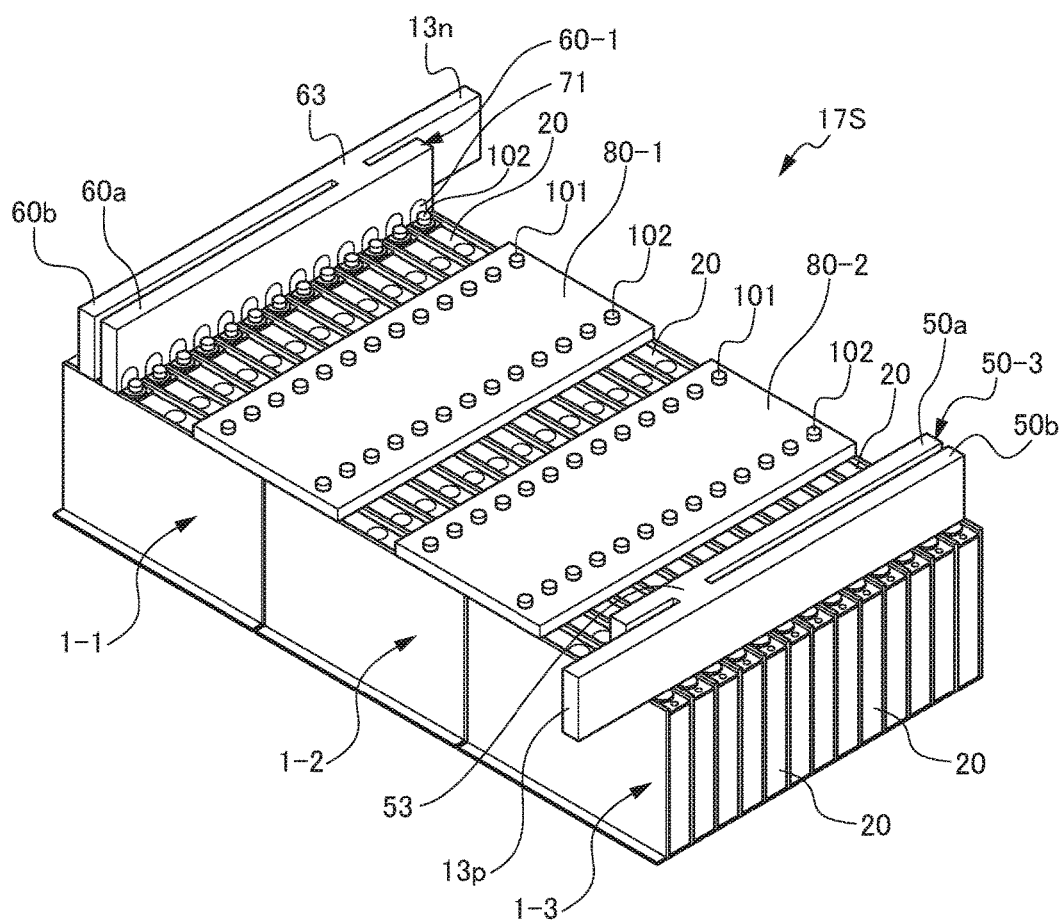
FIG. 18 is a perspective view showing a schematic block diagram of the serial connection body of FIG. 17.

FIG. 17 is a conceptual diagram showing a serial connection body in which three capacitor-type power supply units which are substantially the same as the capacitor-type power supply unit explained by referencing FIG. 1. It should be noted that the respective lithium ion capacitors in FIG. 17 are substantially the same as those of FIG. 7. FIG. 18 is a perspective view showing a schematic block diagram of the serial connection body in FIG. 17. In FIGS. 17 and 18, the three capacitor-type power supply units 1-1, 1-2 and 1-3 constituting the fourth serial connection body 17S are each configured by the plurality of lithium ion capacitors 20 being connected in parallel by the bus bars. The individual lithium ion capacitors 20 respectively have the positive-electrode terminal 101 and negative-electrode terminal 102.

The connection pieces are provided corresponding individually to the negative-electrode terminals 102 of the respective lithium ion capacitors 20 of the capacitor-type power supply unit 1-1. The negative-electrode terminal 102 of the respective lithium ion capacitors 20 and the negative-electrode connection conductor part 60a of the fourth negative-electrode-side bus bar 60-1 are connected by these connection pieces 71. The respective positive-electrode terminals 101 of the respective lithium ion capacitors 20 in the capacitor-type power supply unit 1-1 are connected to the plate-shaped bus bar 80-1. The negative-electrode terminal 102 of the respective lithium ion capacitors 20 in the capacitor-type power supply unit 1-2 are connected to the plate-like bus bar 80-1. The respective positive-electrode terminals 101 of the respective lithium ion capacitors 20 in the capacitor-type power supply unit 1-2 are connected to the plate-like bus bar 80-2. The negative-electrode terminal 102 of the respective lithium ion capacitors 20 in the capacitor-type power supply unit 1-3 w54 connected to the plate-like bus bar 80-2. The positive-electrode terminals 101 of the respective lithium ion capacitors 20 in the capacitor-type power supply unit 1-3 are connected to the positive-electrode connection conductor part 50a of the sixth positive-electrode-side bus bar 50-3 by the connection piece (not visible in the vantage point of FIG. 18), similarly to the negative-electrode terminals 102 of the respective lithium ion capacitors 20 of the aforementioned capacitor-type power supply unit 1-1.

In the fourth serial connection body 17S of FIGS. 17 and 18, the three capacitor-type power supply units 1-1, 1-2 and 1-3 are connected serially by the plate-like bus bars 80-1 and 80-2. In other words, the plate-like bus bar 80-1 functions as a connection conductor that connects in parallel the respective positive-electrode terminals 101 of the respective lithium ion capacitors 20 of the capacitor-type power supply unit 1-1, and serially connects the capacitor-type power supply unit 1-1 and capacitor-type power supply unit 1-2 by the shortest path. In addition, the plate-like bus bar 80-2 functions as a connection conductor that connects in parallel the respective positive-electrode terminals 101 of the respective lithium ion capacitors 20 of the capacitor-type power supply unit 1-2, and serially connects the capacitor-type power supply unit 1-2 and the capacitor-type power supply unit 1-3 by the shortest path.

The negative-electrode-side output conductor 13n is led out from an end on a side relatively close to the negative-electrode-side external connection part 63 of the negative-electrode-side external connection conductor part 60b in the fourth negative-electrode-side bus bar 60-1. In addition, the positive-electrode-side output conductor 13p is let from an end on a side relatively close to the positive-electrode-side external connection part 53 of the positive-electrode-side external connection conductor part 50b in the sixth positive-electrode-side bus bar 50-3.

Also in the fourth serial connection body 17S of FIGS. 17 and 18, the plate-like bus bars 80-1 and 80-2 which are connection conductors are the shortest, which is advantageous in size reduction, weight savings, and suppressing loss of electric power. In addition, as in the first serial connection body 11S explained by referencing FIGS. 11 and 12, the equal dividing of electric current flowing to the lithium ion capacitors 20 is maintained, and the lifespans of the lithium ion capacitors 20 as constituent elements of the serial power unit become equal; therefore, the service life as a whole is extended.

EXPLANATION OF REFERENCE NUMERALS 1, 1a, 1-1, 1-2, 1-3, 1a-1, 1a-2, 1a-3 capacitor-type power supply unit
2, 9 base
10, 20 lithium ion capacitor (electrical storage device)
11a, 11b, 13a, 13b, 15a, 15b connection conductor
11S, 13S, 15S, 17S serial connection body
13n, 15n negative-electrode-side output conductor
13p, 15p positive-electrode-side output conductor
30, 50 positive-electrode-side bus bar (positive-electrode-side parallel connection conductor)
30a, 50a positive-electrode connection conductor part
30b, 50b positive-electrode-side external connection conductor part
31, 51 positive-electrode first end
32, 52 positive-electrode second end
33, 53 positive-electrode-side external connection part
40, 60 negative-electrode-side bus bar (negative-electrode-side parallel connection conductor)
40a, 60a negative-electrode connection conductor part
40b, 60b negative-electrode-side external connection conductor part
41, 61 negative-electrode first end
42, 62 negative-electrode second end
43, 63 negative-electrode-side external connection part
80-1, 80-2 plate-like bus bar
101 positive-electrode terminal
102 negative-electrode terminal
201, 201 connection node

What is claimed is:

1. A capacitor-type power supply unit in which a plurality of a first to $n^{th}$ electrical storage devices are connected in parallel, wherein n is an integer of 6 or greater, the capacitor-type power supply unit comprising:

a positive-electrode-side parallel connection conductor in which each positive-electrode terminal of the first to $n^{th}$ electrical storage devices is connected in sequence from one end to another end of the positive-electrode-side parallel connection conductor; and an negative-electrode-side parallel connection conductor in which each negative-electrode terminal of the first to $n^{th}$ electrical storage devices is connected in sequence from one end to another end of the negative-electrode-side parallel connection conductor, wherein the positive-electrode-side parallel connection conductor has a positive-electrode-side external connection part that is set at a position separated from an end on a side of the first electrical storage device by a length corresponding to a resistance value in a range of 20% to 30% of a resistance value from the one end to the other end, and wherein the negative-electrode-side parallel connection conductor has a negative-electrode-side external connection part that is set at a position separated from an end on a side of the $n^{th}$ electrical storage device by a length corresponding to a resistance value in a range of 20% to 30% of a resistance value from the one end to the other end.

2. The capacitor-type power supply unit according to claim 1, wherein the positive-electrode-side parallel connection conductor has a positive-electrode connection conductor part to which respective positive-electrode terminals of the plurality of electrical storage devices are connected, and a positive-electrode-side external connection conductor part that is provided in parallel at predetermined intervals with the positive-electrode connection conductor part, and is connected with the positive-electrode connection conductor part at a site corresponding to the positive-electrode-side external connection part on the positive-electrode connection conductor part, and wherein the negative-electrode-side parallel connection conductor has an negative-electrode connection conductor part to which respective negative-electrode terminals of the plurality of electrical storage devices are connected, and an negative-electrode-side external connection conductor part that is provided in parallel at predetermined intervals with the negative-electrode connection conductor part, and is connected with the negative-electrode connection conductor part at a site corresponding to the negative-electrode-side external connection part on the negative-electrode connection conductor part.

3. The capacitor-type power supply unit according to claim 2, wherein the electrical storage device is a lithium ion capacitor or a serial connection body thereof.

4. The capacitor-type power supply unit according to claim 2, wherein the electrical storage device is a rechargeable battery or a serial connection body thereof.

5. The capacitor-type power supply unit according to any one of claims 1, wherein the electrical storage device is a lithium ion capacitor or a serial connection body thereof.

6. The capacitor-type power supply unit according to claim 1, wherein the electrical storage device is a rechargeable battery or a serial connection body thereof.

7. A capacitor-type power supply unit in which a plurality of a first to $n^{th}$ electrical storage devices are connected in parallel, wherein n is an integer of 6 or greater, the capacitor-type power supply unit comprising:

a positive-electrode-side parallel connection conductor that extends in a parallel direction of the plurality of electrical storage devices, and in which each positive-electrode terminal of the first to $n^{th}$ electrical storage devices are connected in sequence from one end to another end thereof; and an negative-electrode-side parallel connection conductor that extends in the parallel direction, and in which each negative-electrode terminal of the first to $n^{th}$ electrical storage devices is connected in sequence from one end to another end thereof, wherein the positive-electrode-side parallel connection conductor has a positive-electrode-side external connection part that is set at a position separated from an end on a side of the first electrical storage device by a range of 20% to 30% of a total length in a longitudinal direction thereof, and wherein the negative-electrode-side parallel connection conductor has a negative-electrode-side external connection part that is set at a position separated from an end on a side of the $n^{th}$ electrical storage device by a range of 20% to 30% of a total length in a longitudinal direction thereof.

8. The capacitor-type power supply unit according to claim 7, wherein the positive-electrode-side parallel connection conductor has a positive-electrode connection conductor part to which respective positive-electrode terminals of the plurality of electrical storage devices are connected, and a positive-electrode-side external connection conductor part that is provided in parallel at predetermined intervals with the positive-electrode connection conductor part, and is connected with the positive-electrode connection conductor part at a site corresponding to the positive-electrode-side external connection part on the positive-electrode connection conductor part, and wherein the negative-electrode-side parallel connection conductor has an negative-electrode connection conductor part to which respective negative-electrode terminals of the plurality of electrical storage devices are connected, and an negative-electrode-side external connection conductor part that is provided in parallel at predetermined intervals with the negative-electrode connection conductor part, and is connected with the negative-electrode connection conductor part at a site corresponding to the negative-electrode-side external connection part on the negative-electrode connection conductor part.

9. The capacitor-type power supply unit according to claim 7, wherein the electrical storage device is a lithium ion capacitor or a serial connection body thereof.

10. The capacitor-type power supply unit according to claim 7, wherein the electrical storage device is a rechargeable battery or a serial connection body thereof.

* * * * *